(12) United States Patent
Kogai et al.

(10) Patent No.: US 12,155,924 B2
(45) Date of Patent: Nov. 26, 2024

(54) IMAGE PROCESSING DEVICE, CONTROL METHOD THEREOF, IMAGING APPARATUS, AND PROGRAM STORAGE MEDIUM

(71) Applicant: CANON KABUSHIKI KAISHA, Tokyo (JP)

(72) Inventors: Yukihiro Kogai, Tokyo (JP); Yasushi Ohwa, Tokyo (JP); Hiroyuki Yaguchi, Chiba (JP); Takahiro Usami, Tokyo (JP); Hiroyasu Katagawa, Kanagawa (JP); Tomotaka Uekusa, Kanagawa (JP); Toru Aida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 17/574,806

(22) Filed: Jan. 13, 2022

(65) Prior Publication Data

US 2022/0239836 A1 Jul. 28, 2022

(30) Foreign Application Priority Data

Jan. 25, 2021 (JP) .................................. 2021-009514
Jul. 29, 2021 (JP) .................................. 2021-124236

(51) Int. Cl.
*H04N 23/63* (2023.01)
*G06T 7/136* (2017.01)
*G06T 7/80* (2017.01)
*H04N 23/611* (2023.01)

(52) U.S. Cl.
CPC ............. *H04N 23/63* (2023.01); *G06T 7/136* (2017.01); *G06T 7/80* (2017.01); *H04N 23/611* (2023.01)

(58) Field of Classification Search
CPC ........ H04N 23/63; H04N 23/611; G06T 7/80; G06T 7/136
See application file for complete search history.

(56) References Cited

U.S. PATENT DOCUMENTS

| 5,579,419 | A  | 11/1996 | Yaguchi et al.   |
|-----------|----|---------|------------------|
| 5,581,359 | A  | 12/1996 | Kaburagi et al.  |
| 5,581,377 | A  | 12/1996 | Shimizu et al.   |
| 5,777,750 | A  | 7/1998  | Takiyama et al.  |
| 7,508,547 | B2 | 3/2009  | Nishikawa et al. |
| 7,532,757 | B2 | 5/2009  | Yoshida et al.   |
| 7,545,992 | B2 | 6/2009  | Kato et al.      |
| 7,596,271 | B2 | 9/2009  | Yaguchi et al.   |
| 7,640,269 | B2 | 12/2009 | Yoshida et al.   |

(Continued)

FOREIGN PATENT DOCUMENTS

JP          2005-338352 A      12/2005

*Primary Examiner* — Twyler L Haskins
*Assistant Examiner* — Fayez A Bhuiyan
(74) *Attorney, Agent, or Firm* — Venable LLP

(57) ABSTRACT

An image processing device detects a subject inside a captured image, acquires information of a first subject area and a second subject area that is a part thereof, and detects features of the subject areas. The image processing device calculates evaluation values from the detected feature points. If the second subject area is detected, control of displaying a display frame corresponding to the subject area on the display unit is performed. In addition, if the second subject area is not detected, control of displaying ranging position candidate frames as evaluation values to be displayed on the display unit is performed.

20 Claims, 24 Drawing Sheets

(56) References Cited

U.S. PATENT DOCUMENTS

| | | |
|---|---|---|
| 7,860,266 B2 | 12/2010 | Sekiguchi et al. |
| 2005/0162680 A1 | 7/2005 | Sekiguchi et al. |
| 2005/0264679 A1 | 12/2005 | Sasaki et al. |
| 2006/0008113 A1 | 1/2006 | Matsukubo et al. |
| 2014/0254872 A1* | 9/2014 | Guan .................. G06V 10/50 382/103 |
| 2018/0227481 A1* | 8/2018 | Kimura ................ H04N 23/67 |
| 2020/0106953 A1* | 4/2020 | Suzuki ................ H04N 23/635 |

* cited by examiner

FIG. 8

| EVALUATION VALUE | HIGH | | LOW |
|---|---|---|---|
| DEGREE OF REMARKABILITY | HIGH | ⇔ | LOW |
| DENSITY | HIGH | ⇔ | LOW |
| DEGREE OF RELIABILITY | HIGH | ⇔ | LOW |

- ▨ EVALUATION VALUE: HIGH
- ▨ EVALUATION VALUE: INTERMEDIATE
- ▫ EVALUATION VALUE: LOW
- ☐ RANGING AREA FRAME

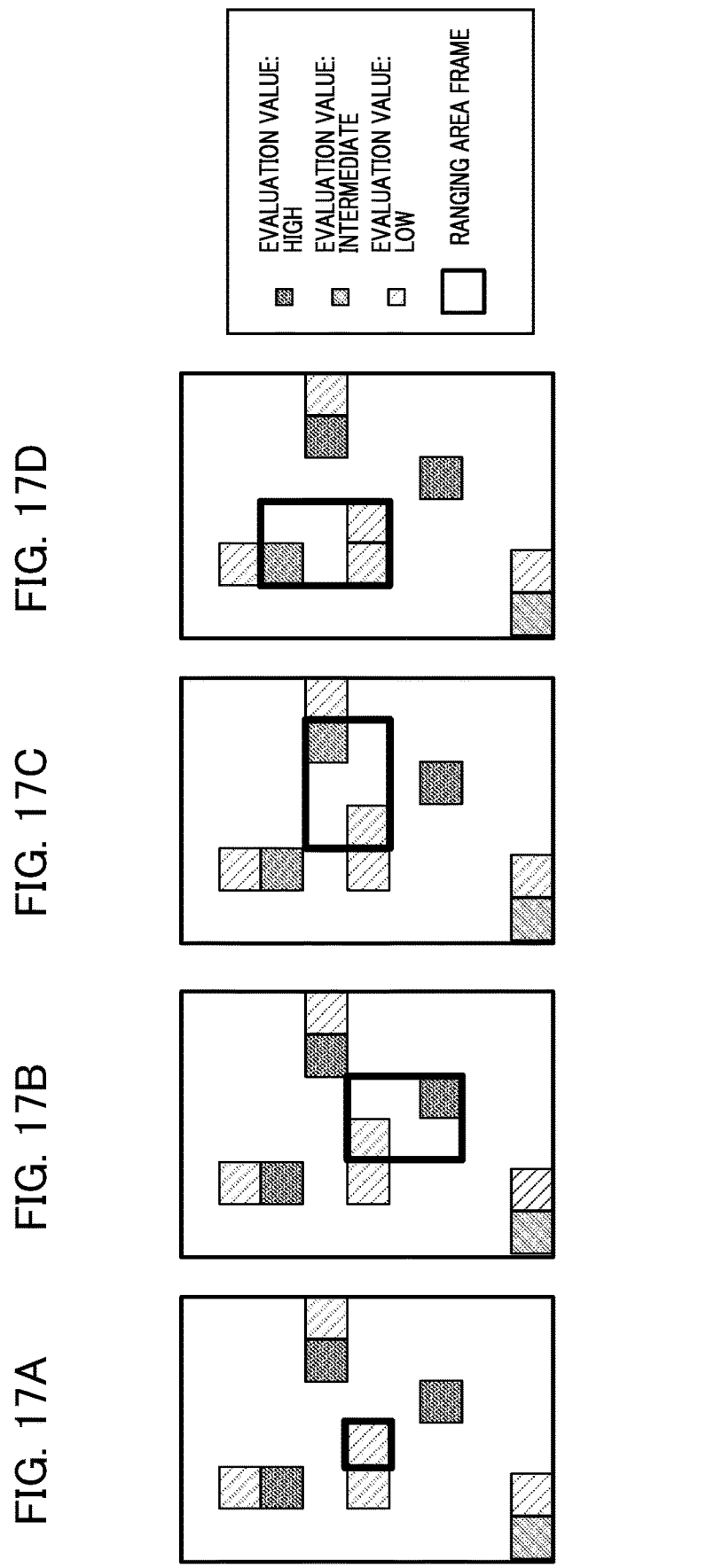

IMAGE PROCESSING DEVICE, CONTROL METHOD THEREOF, IMAGING APPARATUS, AND PROGRAM STORAGE MEDIUM

This application claims the benefit of Japanese Patent Applications No. 2021-009514, filed Jan. 25, 2021 and No. 2021-124236, filed Jul. 29, 2021 which are hereby incorporated by reference herein in their entirety.

BACKGROUND OF THE INVENTION

Field of the Invention

The present invention relates to display control based on evaluation values of images.

Description of the Related Art

In image processing performed within an imaging apparatus, there is a process of detecting a subject area included inside a captured image, in which a subject that is a target for auto-focusing (AF) is detected. An image display device such as a liquid crystal display device or an electrical view finder displays a subject detection result, thereby visually presenting a focus area (an AF frame or the like) to a user. In Japanese Patent Laid-Open No. 2005-338352, technologies for acquiring a video signal from an imaging device for tracking through a signal processing unit and detecting movement of a subject that is a target for AF on the basis of the video signal are disclosed.

In a technology of related art, if a subject is a person, pupils of the person are not detected from image data, and if the size of a detected subject is relatively large such as if a whole body is detected, it is difficult to identify a ranging position inside a subject area. On a subject detection result display screen, there is a possibility that it will be difficult to visually determine an area inside the subject area that is set as a ranging position.

SUMMARY OF THE INVENTION

An image processing device according to one embodiment of the present invention includes: a detection unit configured to detect a first subject area inside an image that corresponds to a first subject and a second subject area inside the image that corresponds to a second subject that is a part of the first subject; a calculation unit configured to calculate evaluation values from information of feature points inside the image, and a control unit configured to perform control of outputting information corresponding to the evaluation values to a display unit; in which the control unit performs control of the display unit to display information corresponding to the evaluation values in an area including the first subject area.

Further features of the present invention will become apparent from the following description of exemplary embodiments with reference to the attached drawings.

BRIEF DESCRIPTION OF THE DRAWINGS

FIG. 8 is a table representing a relationship between an evaluation value and each element in the first embodiment.

FIGS. 17A to 17D are schematic diagrams illustrating another example of ranging area control according to the second embodiment.

DESCRIPTION OF THE EMBODIMENTS

Hereinafter, embodiments of the present invention will be described in detail with reference to the attached drawings. An example in which image processing device is applied to an imaging apparatus such as a digital still camera or a digital video camera will be illustrated.

FIRST EMBODIMENT

Figure 1:
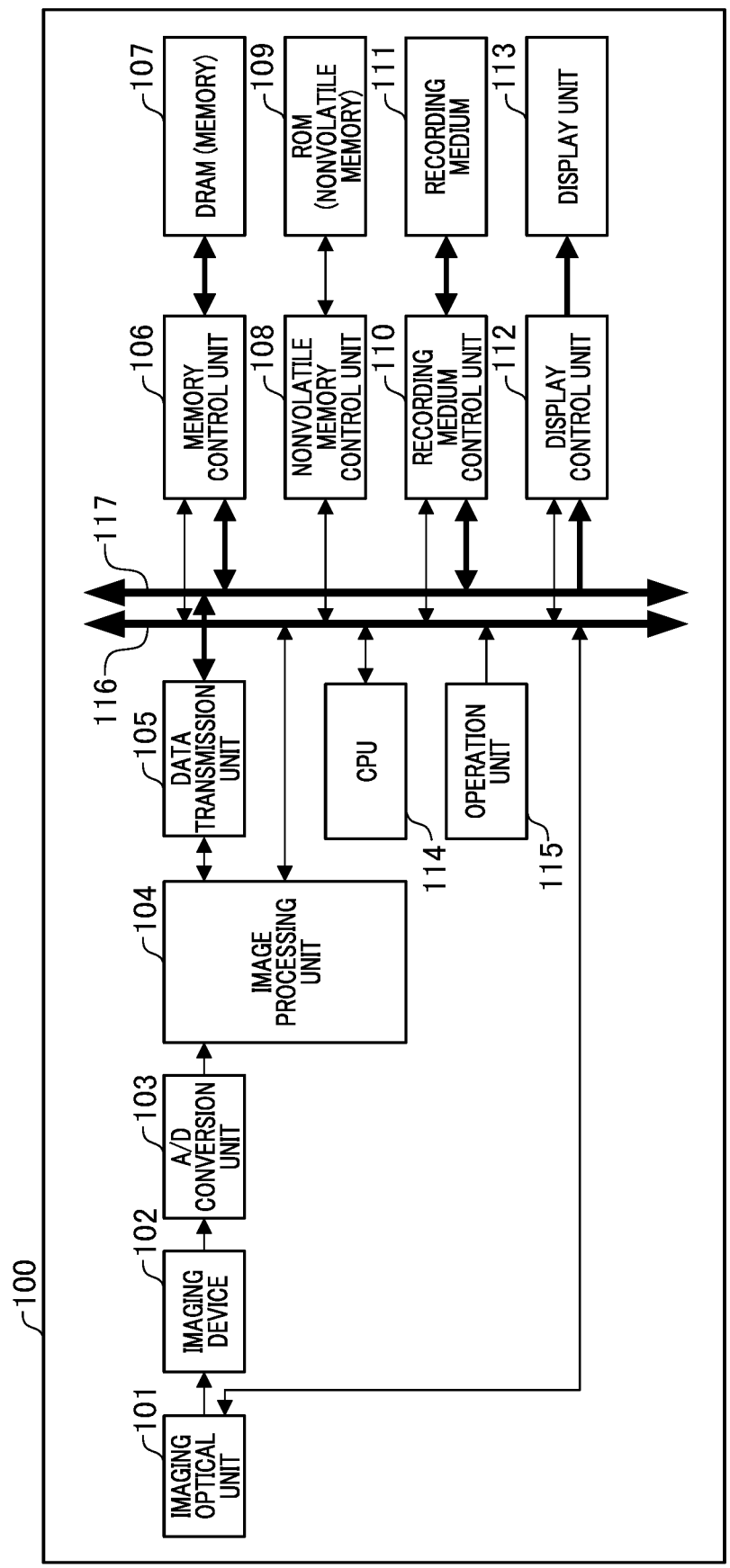
FIG. 1 is a block diagram illustrating the configuration of an image processing device according to a first embodiment.

FIG. 1 is a block diagram illustrating an example of the configuration of an image processing device 100 according to this embodiment. The imaging apparatus to which the image processing device 100 is applied includes an imaging optical unit 101 and an imaging device 102, The imaging optical unit 101 includes optical members such as a lens and a diaphragm configuring an imaging optical system, a drive mechanism unit, and a drive circuit unit. The drive circuit unit of the imaging optical unit 101 is electrically connected to a bus 116. The imaging device 102 is a charge coupled device (CCD) image sensor or a complementary metal oxide semiconductor (CMOS) image sensor that performs photo electric conversion on a captured subject image and outputs an electrical signal corresponding to the subject image.

An A/D conversion unit 103 acquires an analog image signal output by the imaging device 102 and converts the analog image signal into a digital image signal. An image processing unit 104 acquires a digital image signal from the A/D conversion unit 103 and performs various kinds of image processing. The image processing unit 104 is composed of various processing circuit units, a buffer memory, and the like and appropriately performs gamma correction, white balance processing, and the like for digital image data that has been converted from analog to digital.

A data transmission unit 105 is composed of a plurality of direct memory access controllers (DMAC) performing data transmission. A bus 116 is a system bus used for transmitting control signals from a central processing unit (CPU) 114 and the like described below A bus 117 is a data bus used for transmitting image data and the like. The data transmission unit 105 is connected to the image processing unit 104 and the bus 117.

A memory control unit 106 controls a DRAM (random access memory) 107. The DRAM 107 stores data such as a still image, a moving image, sound, and the like and constants, programs, and the like for operations of the CPU 114. The memory control unit 106 is electrically connected to the buses 116 and 117 and performs writing of data into the DRAM 107 and reading of data from the DRAM 107 in accordance with an instruction from the CPU 114 or the data transmission unit 105.

A nonvolatile memory control unit 108 controls a read only memory (ROM) 109. Data stored in the ROM 109 can be electrically removed and recorded, and an electrically erasable programmable read-only memory (EEPROM) or the like is used as the ROM 1109. The ROM 109 stores constants, programs, and the like used for operations of the CPU 114. The nonvolatile memory control unit 108 is electrically connected to the bus 116 and performs writing of data into the ROM 109 and reading of data from the ROM 109 in accordance with an instruction from the CPU 114.

A recording medium control unit. 110 controls a recording medium 111. The recording medium 111 is a recording medium such as an SD card. The recording medium control unit 110 is electrically connected to the buses 116 and 117 and performs recording image data into the recording medium 111 and reading of the recorded data.

A display control unit 112 controls a display unit 113. The display unit 113 includes a liquid crystal display, an electronic view finder, or the like and performs display processing of image data, a menu screen, and the like transmitted from the image processing unit 104. At the time of capturing a still image or at the time of capturing a moving image, the image processing unit 104 processes image data input from the A/D conversion unit 103 in real time, and control of causing the display control unit 112 to display processed data on the display unit 113 is performed. The display control unit 112 is electrically connected to the buses 116 and 117.

The CPU 114 controls the operation of the image processing device 100 through the bus 116. The CPU 114 realizes various functions by executing a program stored in the ROM 109. An operation unit 115 includes switches, buttons, a touch panel, and the like operated by a user and is used for on/off operations of power source and a shutter and the like. The operation unit 115 is electrically connected to the bus 116 and transmits an operation instruction signal of a user to the CPU 114.

Figure 2:
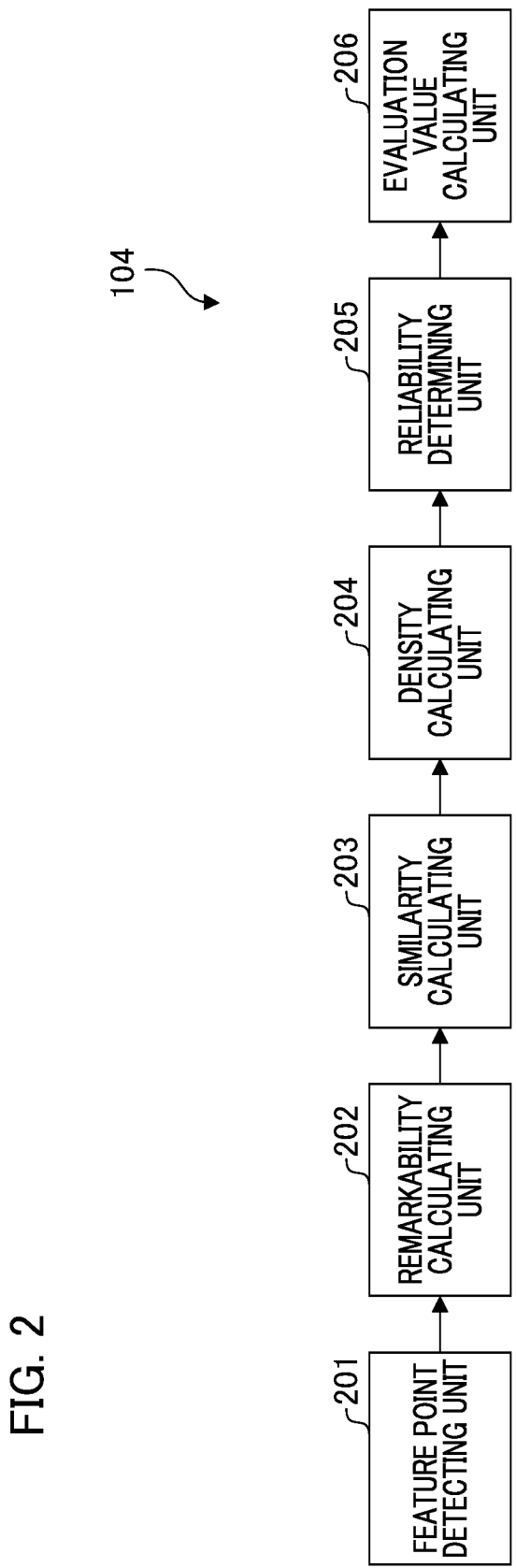
FIG. 2 is a block diagram illustrating an image processing unit according to the first embodiment.

FIG. 2 is a block diagram illustrating an example of the configuration of the image processing unit 104. The image processing unit 104 includes a feature point detecting unit 201, a remarkability calculating unit 202, a similarity calculating unit 203, a density calculating unit 204, a reliability determining unit 205, and an evaluation value calculating unit 206. Each unit can refer to information acquired up to a prior stage as necessary.

The feature point detecting unit 201 acquires image data from the A/D conversion unit 103 and detects feature points in an image. The remarkability calculating unit 202 acquires information of feature points from the feature point detecting unit 201 and calculates degrees of remarkability of the feature points. The similarity calculating unit 203 acquires information from the remarkability calculating unit 202 and calculates degrees of similarity between feature points. The density calculating unit 204 acquires information from the similarity calculating unit 203 and calculates a density of feature points inside an image area. The density is an index that indicates a degree to which feature points present inside an image area are densely positioned. The reliability determining unit 205 acquires information from the density calculating unit 204 and determines a degree of reliability mainly using the information of degrees of similarity. The evaluation value calculating unit 206 calculates an evaluation value on the basis of at least one of a degree of remarkability, a density, and a reliability determination result that have been acquired in a prior stage.

Figure 3:
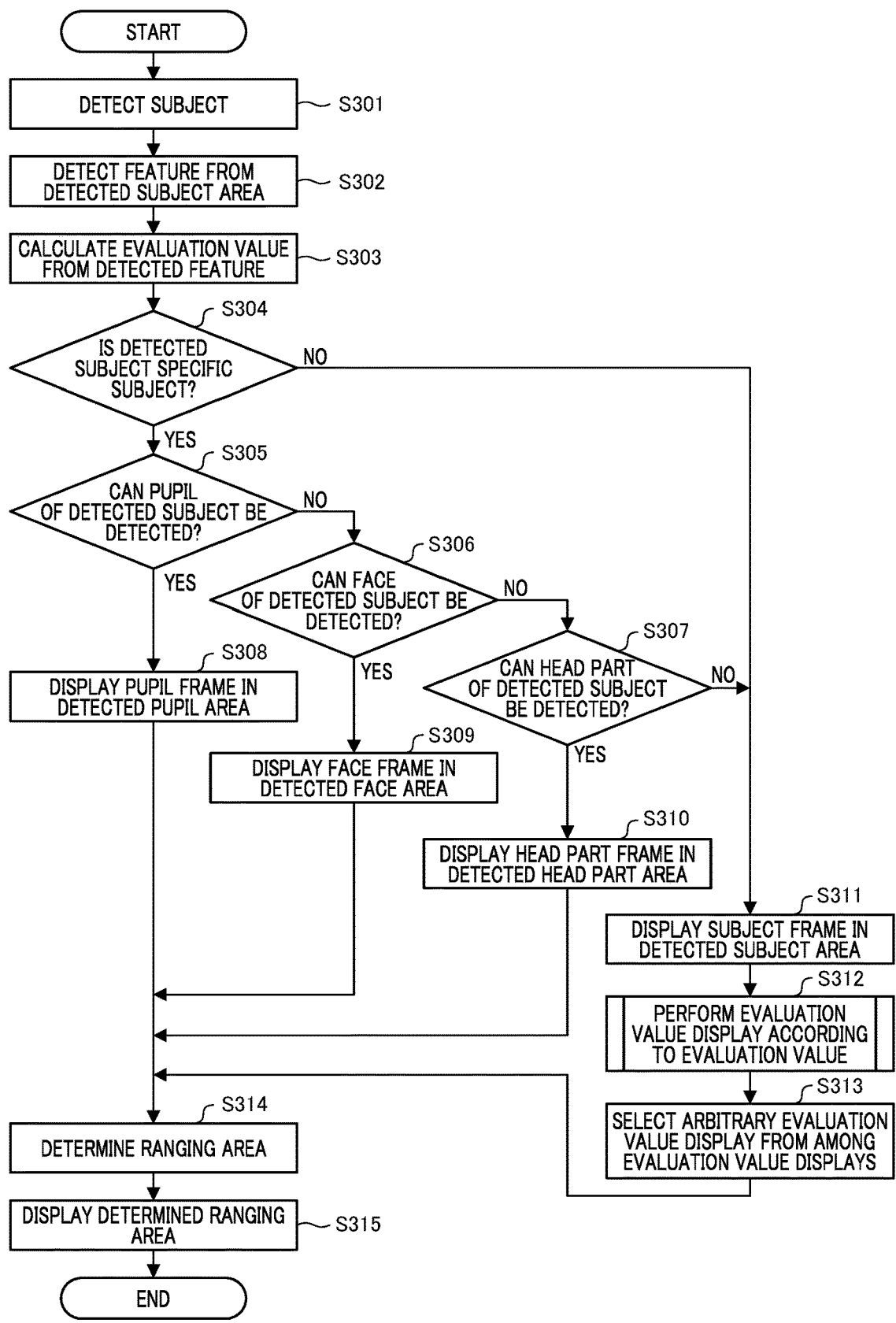
FIG. 3 is a flowchart illustrating evaluation value display control according to the first embodiment.

Selective evaluation value display control according to a subject detection result will be described in detail with reference to FIG. 3. FIG. 3 is a flowchart illustrating the flow of the entire process of selective evaluation value display control according to a subject detection status. In this embodiment, an example of frame display based on evaluation value will be described. A known technology can be used in relation to a method for detecting a subject and a method for detecting a specific part of a subject such as a pupil, a face, or a head part. For example, as the method for detecting a subject, there are a method using parts such as eyes, a nose, and a mouth, a detection method using a learning algorithm represented by a neural network.

In S301, the CPU 114 performs a subject detection process for the inside an image. Subjects, for example, are persons, animals, and the like. In S302, the feature point detecting unit 201 detects feature points from an image area (subject area) of a subject detected in S301. A specific example of the feature point detection process will be described below with reference to FIG. 4. In S303, the image processing unit 104 performs calculation of a degree of remarkability, a density, and a degree of similarity and determination of reliability and calculates an evaluation value for the feature points detected in S302, A specific process will be described below. In S304, the CPU 114 determines whether the subject detected in S301 is a specific subject. For example, the specific subject is a person. If it is determined that the detected subject is the specific subject, the process proceeds to the process of S305. On the other hand, if it is determined that the detected subject is not the specific subject, the process proceeds to S311.

In S305, the CPU 114 determines whether a pupil of the specific subject is able to be detected. If it is determined that a pupil of the specific subject is able to be detected, the process proceeds to the process of S308. On the other hand, if it is determined that a pupil of the specific subject is not able to be detected, the process proceeds to the process of S306. In S306, the CPU 114 determines whether or not a face of the specific subject is able to be detected. If it is determined that the face of the specific subject is able to be detected, the process proceeds to S309. On the other hand, if it is determined that the face of the specific subject is not able to be detected, the process proceeds to the process of S307. In S307, the CPU 114 determines whether a head part of the specific subject is able to be detected. If it is determined that the head part of the specific subject is able to be detected, the process proceeds to the process of S310, On the other hand, if it is determined that the head part of the specific subject is not able to be detected, the process proceeds to the process of S311.

In S308, S309, S310, and S311, the CPU 114 performs control of displaying a frame in a detected area. In other words, the display unit 113 displays a pupil frame for a detected pupil area in S308, and the display unit 113 displays a face frame for a detected face area in S309. The display unit 113 displays a head part frame for the detected head part area in S310, and the display unit 113 displays a subject frame for the detected subject area in S311.

After S308, S309, and S310, the process proceeds to the process of S314, and, after S311, the process proceeds to the process of S312. In S312, the CPU 114 validates frame display according to the evaluation value calculated in S303 for the subject determined not to be the specific subject in S304 or the subject of which a part (the pupil, the face, or the head part) has been determined not to be detectable in S305 to S307. Next, in S313, after a process of selecting evaluation value display (frame display) is performed, the process proceeds to the process of S314, Details of the evaluation value display will be described below.

In S314, the CPU 114 determines a ranging area (a focus state detection area) on the basis of the frame display selected in S313. In S315, the CPU 114 performs control of displaying the ranging area determined in S314 using the display unit 113. Then, the series of processes ends.

Figure 4:
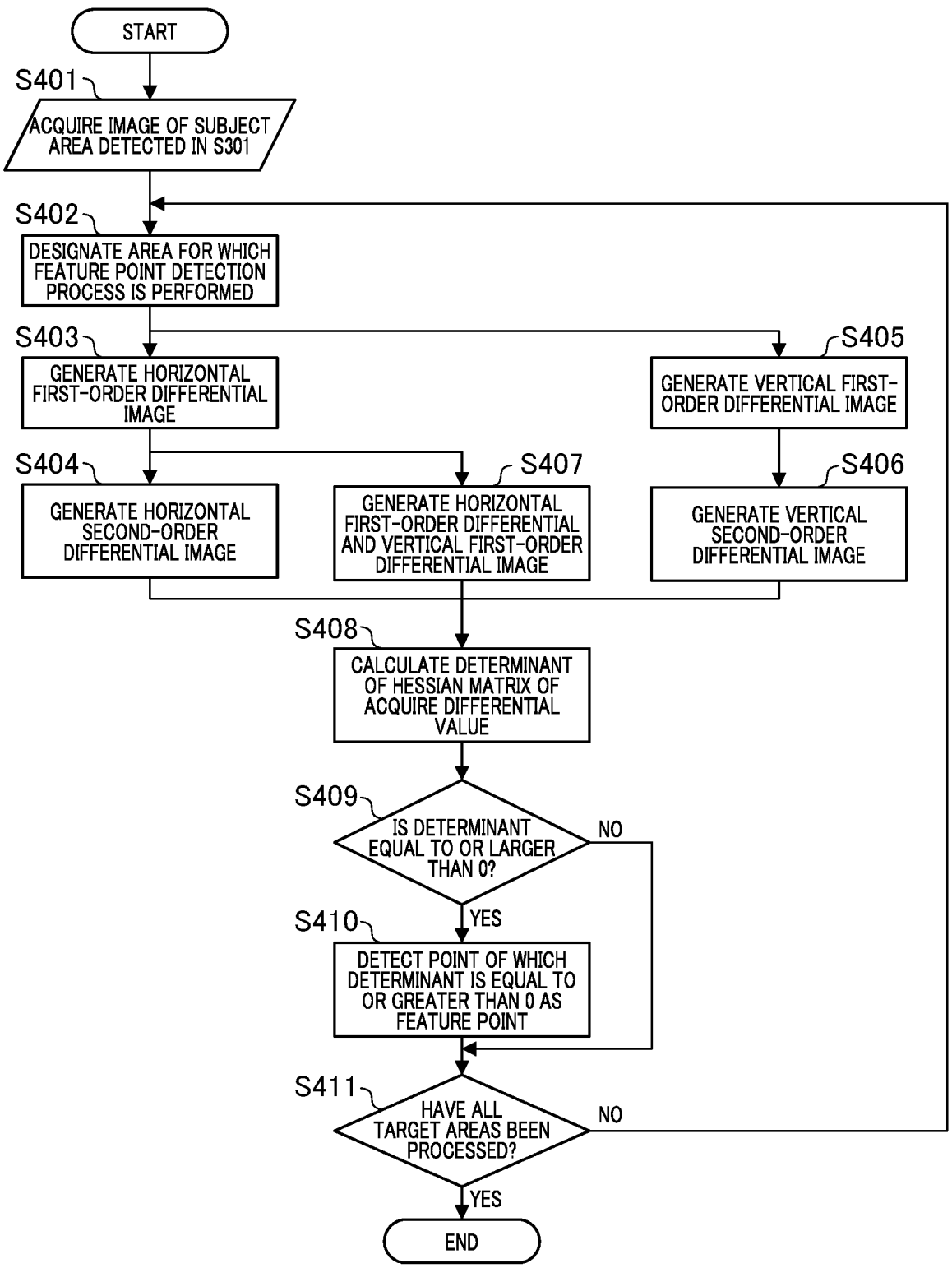
FIG. 4 is a flowchart illustrating a feature point detection process according to the first embodiment.

Hereinafter, the process illustrated in FIG. 3 will be described more specifically with reference to FIGS. 4 to 12. FIG. 4 is a flowchart of a process performed by the feature point detecting unit 201 and the remarkability calculating unit 202, In S401, image data of the subject area detected in S301 illustrated in FIG. 3 is acquired. In S402, the feature point detecting unit 201 designates an area for which a feature point detection process is performed for image data of the detected subject area.

In S403, the feature point detecting unit 201 performs horizontal first-order differential filter processing on the area designated in S402, whereby a horizontal first-order differential image is generated. In S404, the feature point detecting unit 201 further performs a horizontal first-order differential filter processing on the horizontal first-order differential image acquired in S403, whereby a horizontal second-order differential image is generated.

The processes of S405 and S406 are vertical differential filter processing on an image performed as concurrent processing of S403 and S404. In S405, the feature point detecting unit 201 performs a vertical first-order differential filter processing for the area designated in S402, whereby a vertical first-order differential image is generated. In S406, the feature point detecting unit 201 further performs vertical first-order differential filter processing for the vertical first-order differential image acquired in S405, whereby a vertical second-order differential image is generated.

The process of S407 is differential filter processing of an image that is performed as concurrent processing of S404. In S407, the feature point detecting unit 201 further performs vertical first-order differential filter processing on the horizontal first-order differential image acquired in S403, whereby a horizontal first-order differential and vertical first-order differential image is generated.

After S404, S406, and S407, the process proceeds to the process of S408. In S408, the remarkability calculating unit 202 calculates a determinant (hereinafter denoted as Det) of a Hessian matrix (hereinafter denoted as H) of differential values acquired in S404, S406, and S407. The horizontal second-order differential value acquired in S404 will be denoted as Lxx, the vertical second-order differential value acquired in S406 will be denoted as Lyre, and the horizontal first-order differential and vertical first-order differential value acquired in S407 will be denoted as Lxy. The Hessian matrix H is represented as Equation (1) represented below, and the determinant Det is represented as (2) represented below.

$$H = \begin{bmatrix} L_{xx} & L_{xy} \\ L_{xy} & L_{yy} \end{bmatrix} \quad (1)$$

$$\text{Det} = L_{xx} * L_{yy} - L_{xy}^2 \quad (2)$$

in S409, the remarkability calculating unit 202 determines whether or not the value of the determinant Det calculated in S408 is equal to or greater than zero. If it is determined that the value of the determinant Det is equal to or greater than zero, the process proceeds to the process of S410. On the other hand, if it is determined that the value of the determinant Det is smaller than zero, the process proceeds to the process of S411.

In S410, after the process of detecting points of which the value of determinant Det is equal to or greater than zero as feature points is performed, the feature point detecting unit 201 proceeds to the process of S411. In S411, the feature point detecting unit 201 or the remarkability calculating unit 202 determines whether the process has been performed for all the subject areas input in S401. If it is determined that the process has ended for all the target areas, the feature point detection process illustrated in FIG. 4 ends. On the other hand, if it is determined that there is a target area that has not been processed, the process returns to S402, and the processes of S402 to S410 are repeatedly performed.

Figure 5:
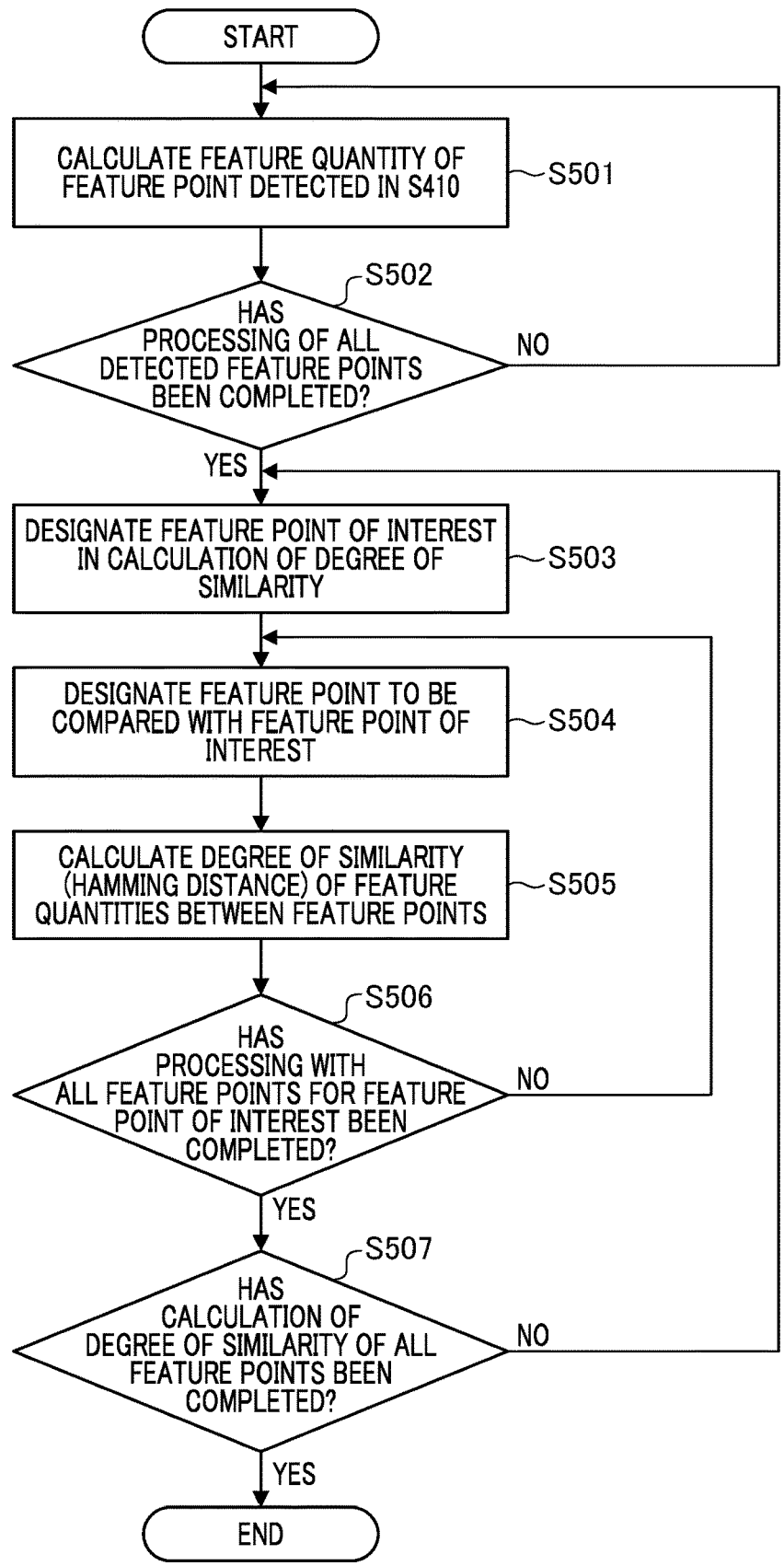
FIG. 5 is a flowchart illustrating a similarity calculation process according to the first embodiment.
Figure 6:
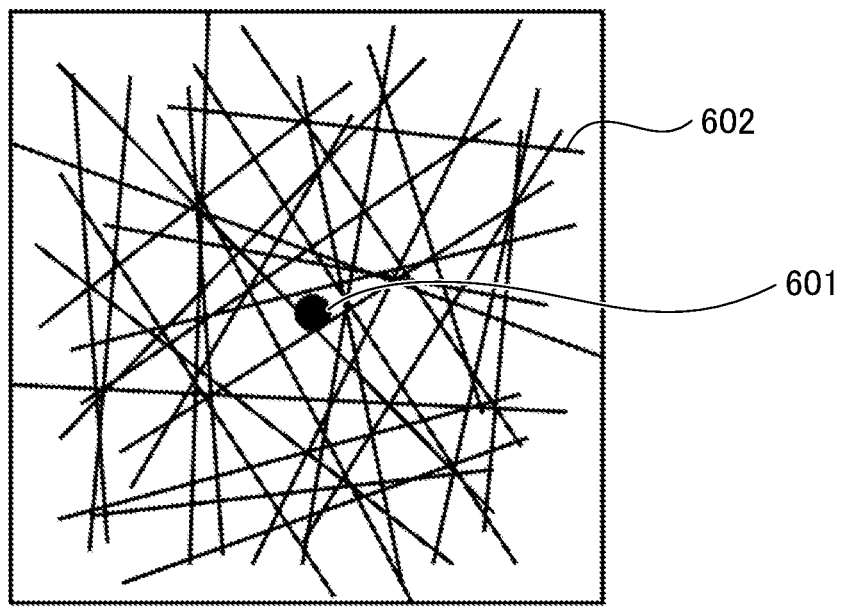
FIG. 6 is a schematic diagram of a feature quantity calculation process in calculating a degree of similarity.

FIG. 5 is a flowchart illustrating a process performed by the similarity calculating unit 203. In S501, the similarity calculating unit 203 calculates feature quantities for feature points detected in S410 illustrated in FIG. 4 by the feature point detecting unit 201. FIG. 6 is a schematic diagram illustrating a feature quantity calculation process. A point of interest 601 is represented as a block point in an image. In addition, a plurality of segment patterns 602, which are random, are illustrated in the vicinity of a feature point that is the point of interest 601, In this embodiment, an example in which a magnitude relation of luminance values of both ends of each segment is expressed as 1 and 0 is illustrated. A quantity of bit stream acquired by representing magnitude relations of all the "1"s and "0"s for the segment patterns 602 is calculated as a feature quantity.

In S502 illustrated in FIG. 5, the process of determining whether calculation of feature quantities has been completed for all the feature points detected in S410 illustrated in FIG. 4 is performed. If it is determined that calculation of feature quantities has been completed for all the feature points, the process proceeds to the process of S503. If it is determined that calculation of feature quantities has not been completed, the process of calculating feature quantities in S501 is repeatedly performed.

After designating a feature point for which a similarity calculation process is performed in S503, in S504, the similarity calculating unit 203 designates a feature point, which is the other party, for which a degree of similarity is compared for the feature point designated in S503. In S505, the similarity calculating unit 203 calculates a Hamming distance (denoted as D) between feature quantities of feature points designated in S503 and S504. A bit stream of feature quantities of the feature point designated in S503 is denoted as A, and elements thereof are denoted as Ai. A bit stream of feature quantities of the feature point designated in S504 is denoted as B, and elements thereof are denoted as Bi. The Hamming distance D representing a degree of similarity is represented as Equation (3) presented below.

$$D = \sum_{i}^{N} xor(A_i, B_i) \quad (3)$$

In Equation (3), xor represents an exclusive OR operation.

In S506, the process of determining whether the process of calculating Hamming distances D from all the feature points has been completed for the feature point of interest in S503 is performed. If it is determined that the process of calculating degrees of similarity (Hamming distances) has been completed, the process proceeds to the process of S507. On the other hand, if it is determined that the process of calculating degrees of similarity (Hamming distances) has not been completed, the process returns to S504, and the processes of S504 and S505 are repeatedly performed.

In S507, the process of determining whether the process has been completed for all the feature points is performed. If it is determined that the process has been completed for all the feature points, the similarity calculation process ends. On the other hand, if it is determined that the process has not been completed for all the feature points, the process returns to S503, and the processes of S503 to S507 are repeatedly performed.

Figure 7:
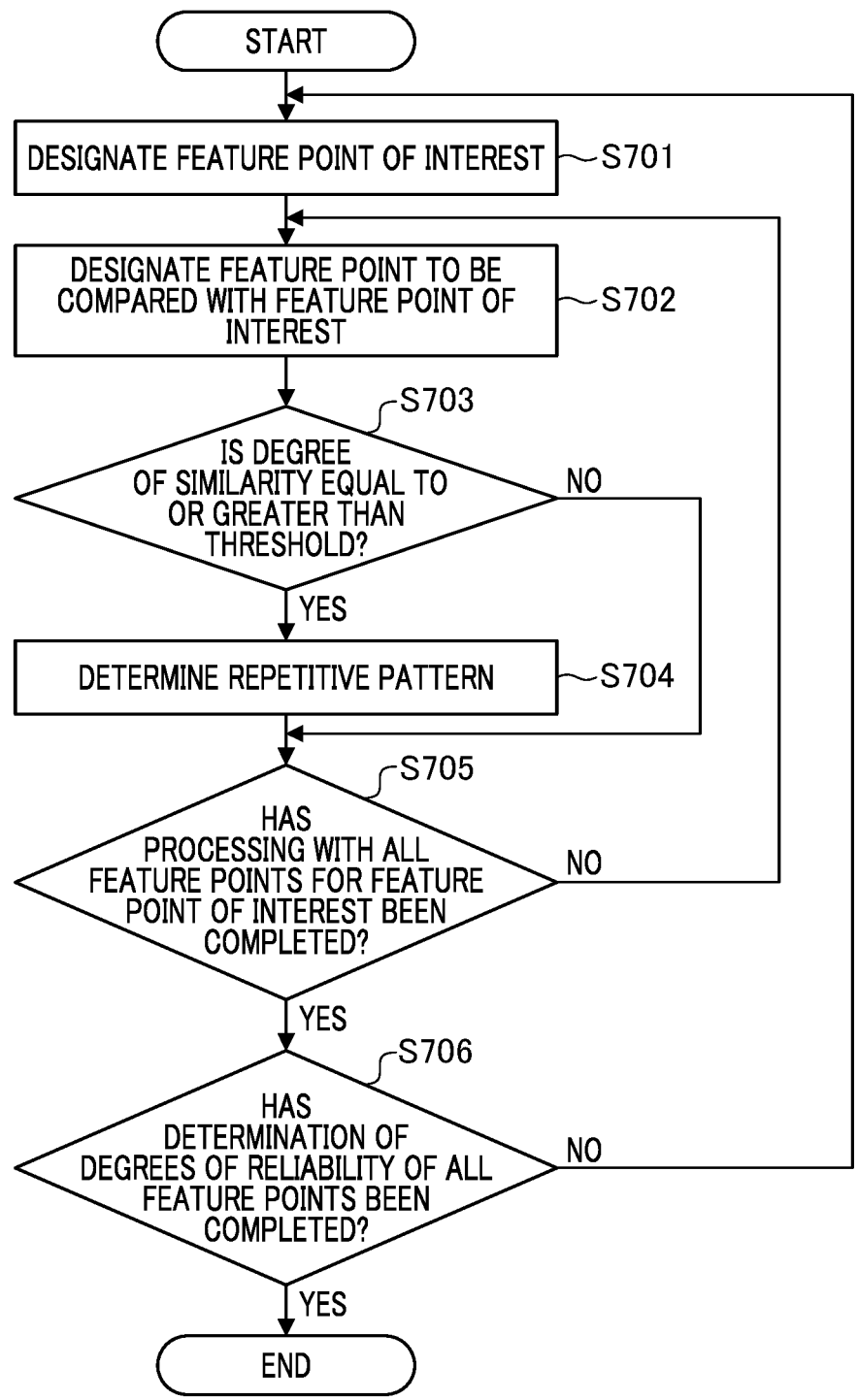
FIG. 7 is a flowchart illustrating a reliability determining process according to the first embodiment.

FIG. 7 is a flowchart illustrating a process performed by the reliability determining unit 205. The reliability determining unit 205 designates a feature point of interest for determination of reliability in S701 and designates a feature point, which is the other party, compared with the feature point designated in S701 in S702. In S703, the reliability determining unit 205 compares a degree of similarity between the feature points designated in S701 and S702 with a threshold (denoted as M) on the basis of the degree of similarity calculated by the similarity calculating unit 203. The process of determining whether the degree of similarity is equal to or greater than the threshold (M or more) is performed. For example, when the number of bits of the bit stream of a feature quantity is 50, the degree of similarity is a maximum when the Hamming distance D is 0. For example, the threshold M is set to 10. However, the number of bits of the bit stream and the threshold M are changeable. If it is determined that the degree of similarity is equal to or greater than the threshold, the process proceeds to the process of S704. On the other hand, if it is determined that the degree of similarity is smaller than the threshold, the process proceeds to the process of S705.

In S704, the reliability determining unit 205 performs repetitive pattern determination for feature points for which the degrees of similarity are determined to be equal to or greater than the threshold M in S703. The repetitive pattern represents a feature of a high possibility of detecting an error and having low reliability in a status in which there are many similar features inside the same screen. One example is a captured view in which windows of a building with the same shape are consecutively arranged.

In S705, the reliability determining unit 205 determines whether the process with all the feature points has been completed for the feature point of interest in S701. If it is determined that the reliability determination process for the point of interest has been completed, the process proceeds to the process of S706. On the other hand, if it is determined that the reliability determination process for the point of interest has not been completed, the process returns to S702 and continues.

In S706, the reliability determining unit 205 determines whether the process has been completed for all the feature points. If it is determined that the process has been completed for all the feature points, the reliability determination process ends. On the other hand, if it is determined that the reliability determination process has not been completed, the process returns to S701, and the reliability determination process continues.

FIG. 8 is a diagram illustrating evaluation value elements in calculation of evaluation values that are performed by the evaluation value calculating unit 206 as a table. The evaluation value calculating unit 206 determines an evaluation value on the basis of results acquired by the feature point detecting unit 201, the remarkability calculating unit 202, the density calculating unit 204, and the reliability determining unit 205. FIG. 8 illustrates an example of a relation between "high" and "low" of the evaluation value and "high" and "low" of the degree of remarkability, a density, and a degree of reliability corresponding thereto. For example, if one of the degree of remarkability, the density, and the degree of reliability is "high," "high" of the evaluation value is acquired.

In S312, the process of validating display of a frame according to an evaluation value is performed for a subject that is not determined as the specific subject or a subject of which a pupil, a face, and a head part are not detected on the basis of the evaluation value calculated in S303 illustrated in FIG. 3. Hereinafter, a display frame according to an evaluation value will be referred to as a ranging position candidate frame.

Figure 9:
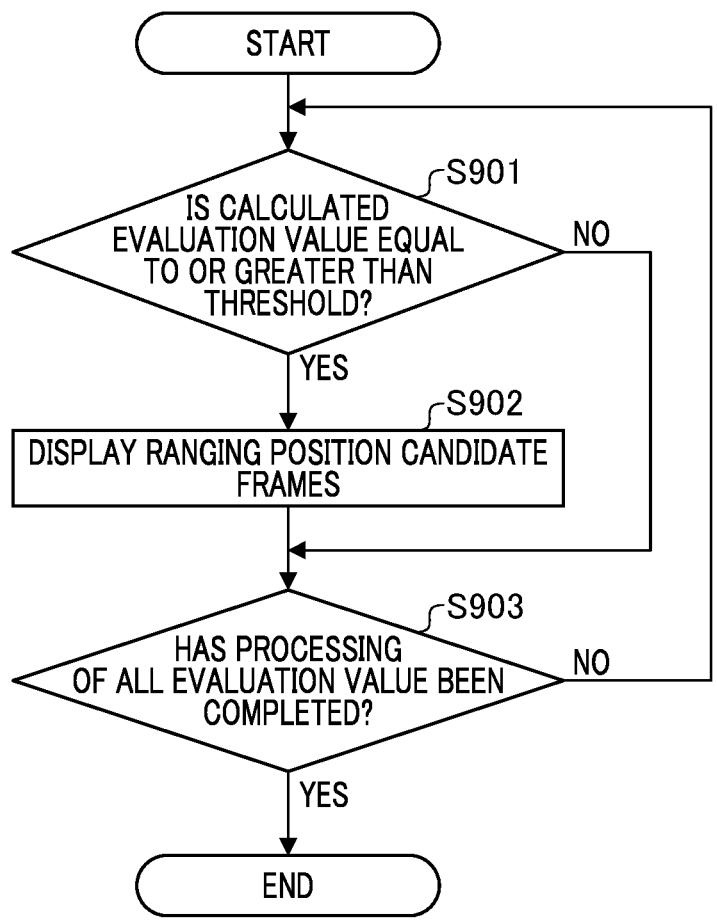
FIG. 9 is a flowchart illustrating frame display number control according to the first embodiment.
Figure 10A:
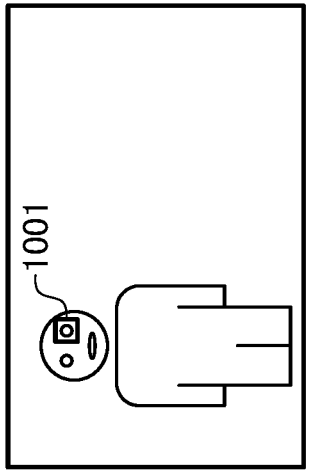
FIGS. 10A to 10E are schematic diagrams of frame display based on an evaluation value according to the first embodiment.
Figure 10B:
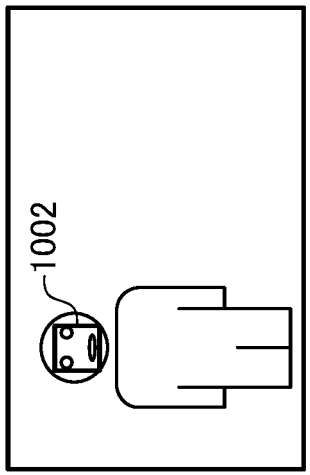
Figure 10C:
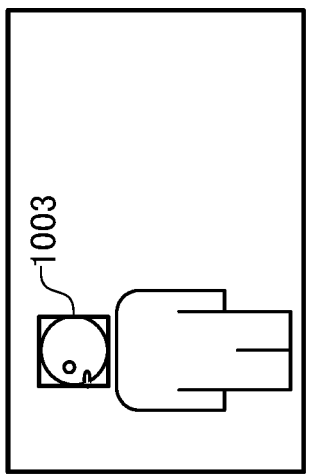
Figure 10D:
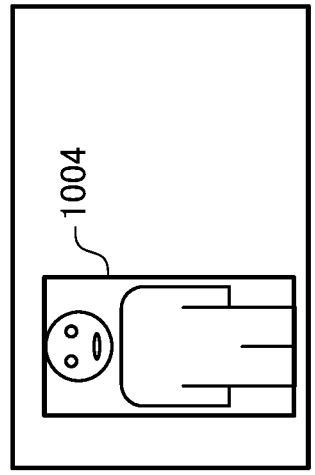
Figure 10E:
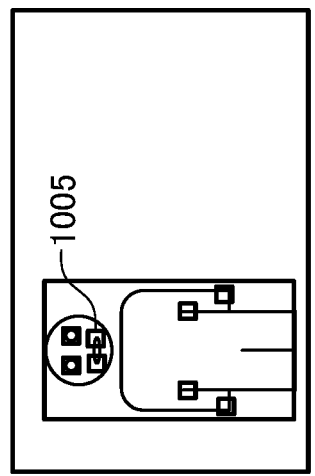

FIG. 9 is a flowchart illustrating display control that is performed if display of a ranging position candidate frame is valid. FIGS. 10A to 10E are schematic diagrams illustrating an example of display of the display unit 113 according to detection statuses of subjects. FIG. 10A illustrates a display frame 1001 at the time of detecting a pupil of a subject, and FIG. 10B illustrates a display frame 1002 at the time of detecting a face of a subject. FIG. 10C illustrates a display frame 1003 at the time of detecting a head part of a subject, and FIG. 10D illustrates a display frame 1004 at the time of detecting a subject (the whole body). A display example of FIG. 10E illustrates a case in which display of ranging position candidate frames is validated, and a plurality of ranging position candidate frames 1005 are displayed.

In S901 illustrated in FIG. 9, the image processing unit 104 determines whether or not a degree of remarkability of a feature point calculated by the feature point detecting unit 201 and the remarkability calculating unit 202 is equal to or greater than a threshold (denoted as N). As a specific example, the value of a determinant Det of a Hessian matrix H corresponds to a degree of remarkability, and the threshold N is set to 0.5. The threshold N is a fixed value or a variable value. If the threshold N is a variable value, the number of ranging position candidate frames that are displayed can be controlled by changing the threshold N. If it is determined that the value of the determinant Det (the evaluation value) is equal to or greater than the threshold (N or more), the process proceeds to the process of S902. On the other hand, if it is determined that the value of the determinant Det is smaller than the threshold (less than N), the process proceeds to the process of S903.

In S902, the display unit 113 displays ranging position candidate frames. Next in S903, the process of determining whether the process of displaying ranging position candidate frames has been completed for all the evaluation values is performed. If it is determined that the process for all the evaluation values has been completed, the process of displaying ranging position candidate frames ends (proceeds to S313 illustrated in FIG. 3). On the other hand, if it is determined that the process has not been completed, the process returns to S901, and the processes of S901 to S903 are repeatedly performed.

Figure 11:
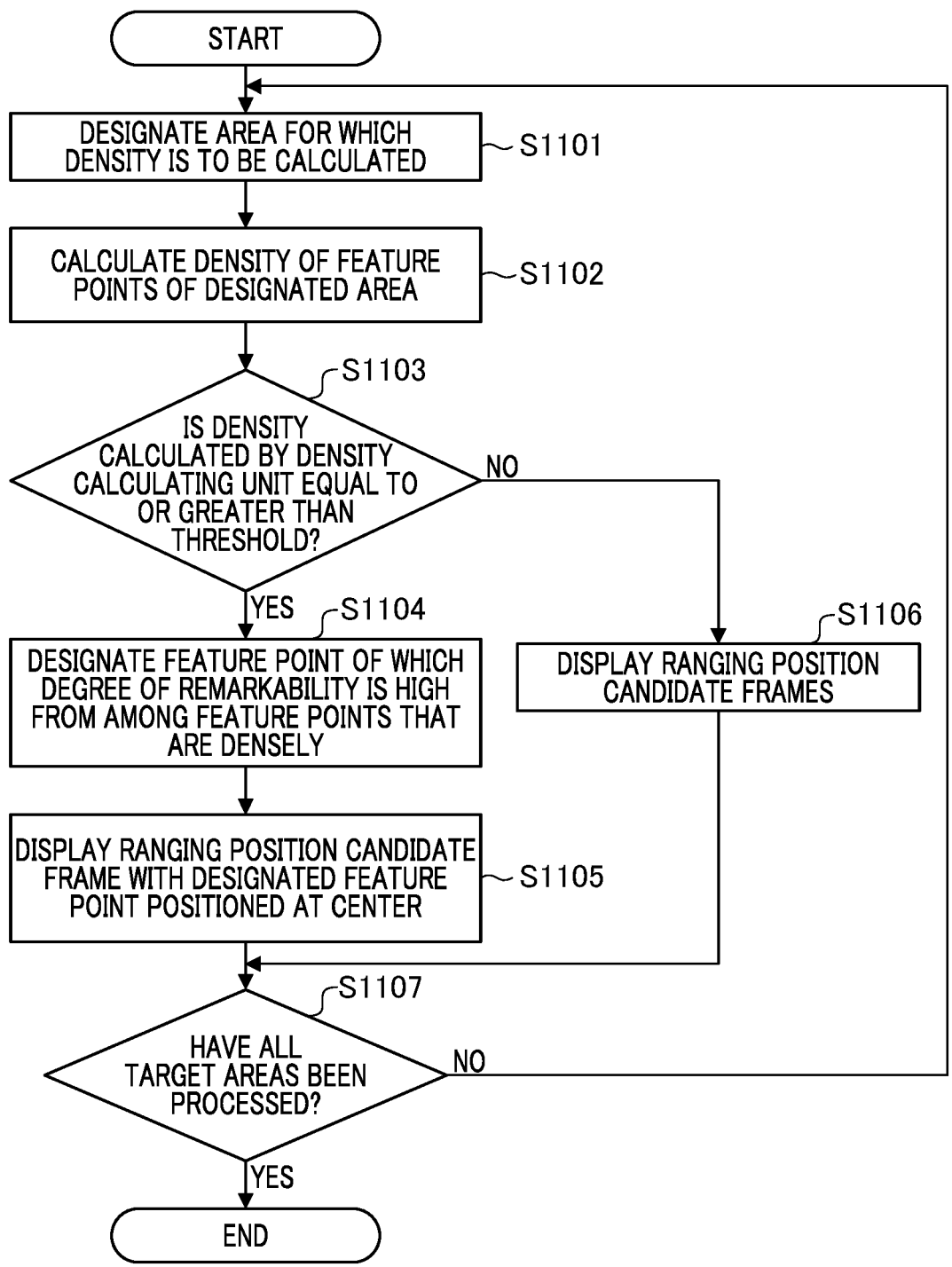
FIG. 11 is a flowchart illustrating frame display control according to a density in the first embodiment.
Figure 12B:
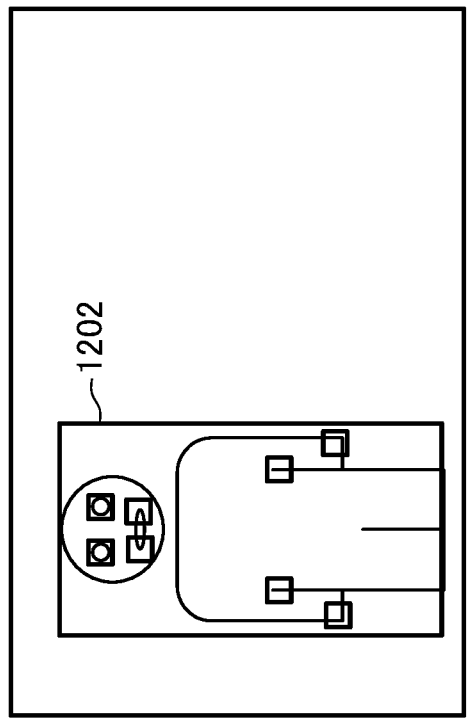
FIGS. 12A and 12B are schematic diagrams of frame display control according to a density in the first embodiment.
Figure 12A:
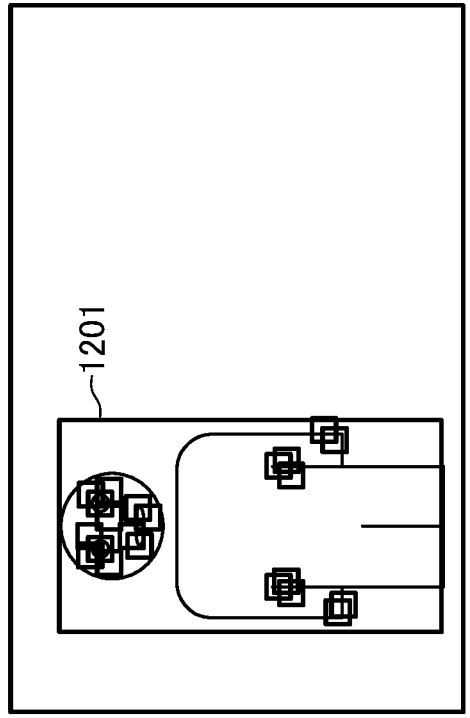

FIG. 11 is a flowchart illustrating, frame display control according, to a density that is performed if display of ranging position candidate frames is valid. FIGS. 12A and 12B are schematic diagrams illustrating an example of display of the display unit 113 in relation to presence/absence of frame display control according to a density. FIG. 12A illustrates a display example 1201 that is displayed if the frame display control illustrated in FIG. 11 is not performed, and ranging position candidate frames that are not based on evaluation values (a density and a degree of remarkability) are comprehensively displayed. When the number of displayed ranging position candidate frames is large, there is a possibility that it will become difficult for a user to select a ranging position candidate frame. In contrast to this, FIG. 12B illustrates a display example 1202 that is displayed if the frame display control illustrated in FIG. 11 is performed. The ranging position candidate frames based on evaluation values (densities and degrees of remarkability) are displayed.

In S1101 illustrated in FIG. 11, the density calculating unit 204 designates an area of which a density is calculated. In this embodiment, an example in which a density is calculated for each block if the inside of a subject area is divided into a plurality of blocks is illustrated. In S1102, the density calculating unit 204 calculates a density of feature points in the area designated in S1101. In this embodiment, the density is calculated by counting the number of feature points present inside the designated area.

In S1103, the process of determining whether the density calculated in S1102 is equal to or greater than a threshold (denoted as P) is performed. The threshold P is a fixed value or a variable value. If the threshold P is set as a variable value, the number of ranging position candidate frames that are displayed can be controlled by controlling the threshold P. In S1103, if it is determined that the density is equal to or higher than the threshold (P or more), the process proceeds to the process of S1104. On the other hand, if it is determined that the density is lower than the threshold P, the process proceeds to the process of S1106.

In S1104, the density calculating unit 204 designates a feature point of which a degree of remarkability is higher than the threshold in the area in which the density is determined to be equal to or higher than the threshold Pin S1103. In S1105, the display unit 113 displays a ranging position candidate frame with the feature point designated in S1104 positioned at the center thereof. In accordance with this, a representative frame of which the evaluation value is high can be displayed for an area in which the density is high. In addition, in S1106, the display unit 113 displays a ranging position candidate frame according to the degree of remarkability for an area in which the density is determined to be lower than the threshold Pin S1103.

In S1107 after S1105 and S1106, the process of determining whether the process has been completed for all the target areas is performed. If it is determined that the process has been completed for all the target areas, the frame display control according to the density ends. On the other hand, if it is determined that the process has not been completed for all the target areas, the process returns to S1101, and the processes of S1101 to S1106 are repeatedly performed.

In S313 illustrated in FIG. 3, the process of selecting an arbitrary frame from displayed ranging position candidate frames is performed. As in the example of FIG. 10E or FIG. 12B, an arbitrary frame is selected from the displayed ranging position candidate frames. Examples of the process include an automatic selection process based on a predetermined condition, a manual selection process, and a semi-automatic selection process based on presentation of a recommended option. Here, an example of selection of a frame according to a user operation is illustrated. In an embodiment in which a touch panel is provided, a user can designate a selection by touching a frame desired to be selected as a ranging position among a plurality of frames. As a method used for a selection operation, a button operation, a stick operation, or the like may be used instead of the touch operation.

In this embodiment, evaluation values are calculated using degrees of remarkability, densities, and degrees of reliability of feature points detected inside an image, and evaluation value display control, for example, display control of ranging position candidate frames is performed in accordance with the status of detection of subjects. In accordance with this, even if a pupil, a face, or a head part of a specific subject cannot be detected, by performing frame display, a user can visually recognize ranging position candidates. In addition, by controlling the threshold in displaying ranging position candidate frames, an area frame having a relatively high evaluation value can be displayed. By a user selecting an intended ranging area, a ranging area can be determined with both the performance of ranging and user's intention taken into account.

Modified Example of First Embodiment

In the first embodiment, although the remarkability calculation method based on detection of feature points using a Hessian matrix has been described, another calculation method such as an edge detection method or a corner detection method may be used. In addition, in relation to calculation of feature quantities of feature points, although a calculation method based on a magnitude relation between a feature point and luminance values in the vicinity thereof has been described, a feature quantity calculation method based on hue and chroma may be used. In addition, in relation to frame display control according to a density, although a method of displaying a representative ranging position candidate frame by designating an area having a high degree of remarkability has been described, a representative ranging position candidate frame may be determined using the center of gravity of the area or the like.

In the first embodiment, although a color and a line type of a display frame are not described, the process of changing the color or the line type of each display frame according to a calculated evaluation value is performed in a modified example. For example, the display unit 113 displays a first display frame for the entire subject using a first color or a first line type and displays a second display frame for a part of the subject using a second color or a second line type according to an evaluation value of each part, and thus a user can easily visually recognize the display frames.

SECOND EMBODIMENT

Next, a second embodiment of the present invention will be described. In this first embodiment, as a display method used when the evaluation value display control is performed in accordance with a detection status of a subject, the frame display has been illustrated as an example. In contrast to this, in this embodiment, as an evaluation value display method according to a detection status of a subject, color-coded display is illustrated as an example. Detailed description of items and components similar to those according to the first embodiment will be omitted, and different parts that are different from the first embodiment will be focused on in description. Such a method for omitting description is the same in embodiments to be described below.

Figure 13:
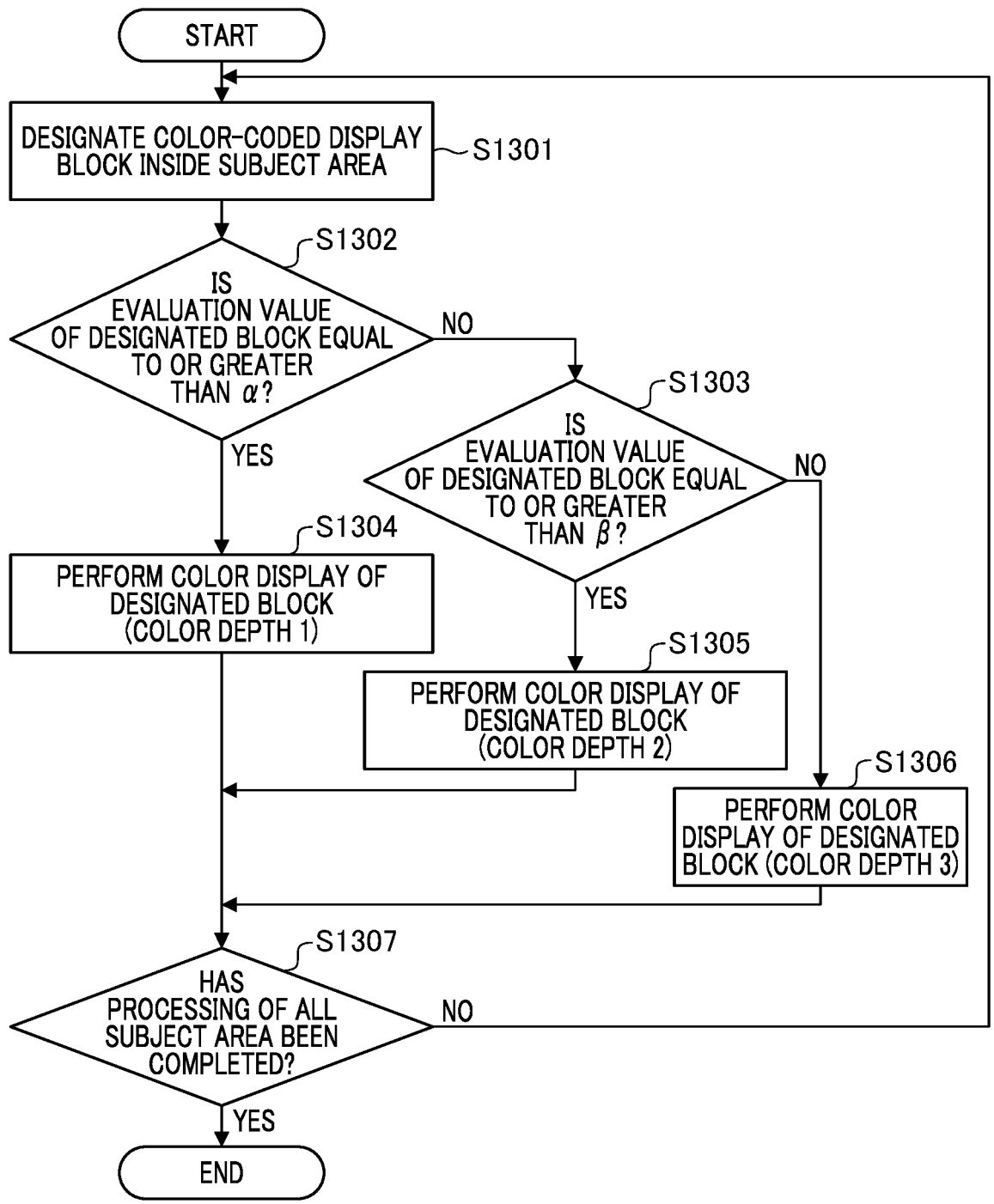
FIG. 13 is a flowchart illustrating evaluation value display control according to a second embodiment.
Figure 14:
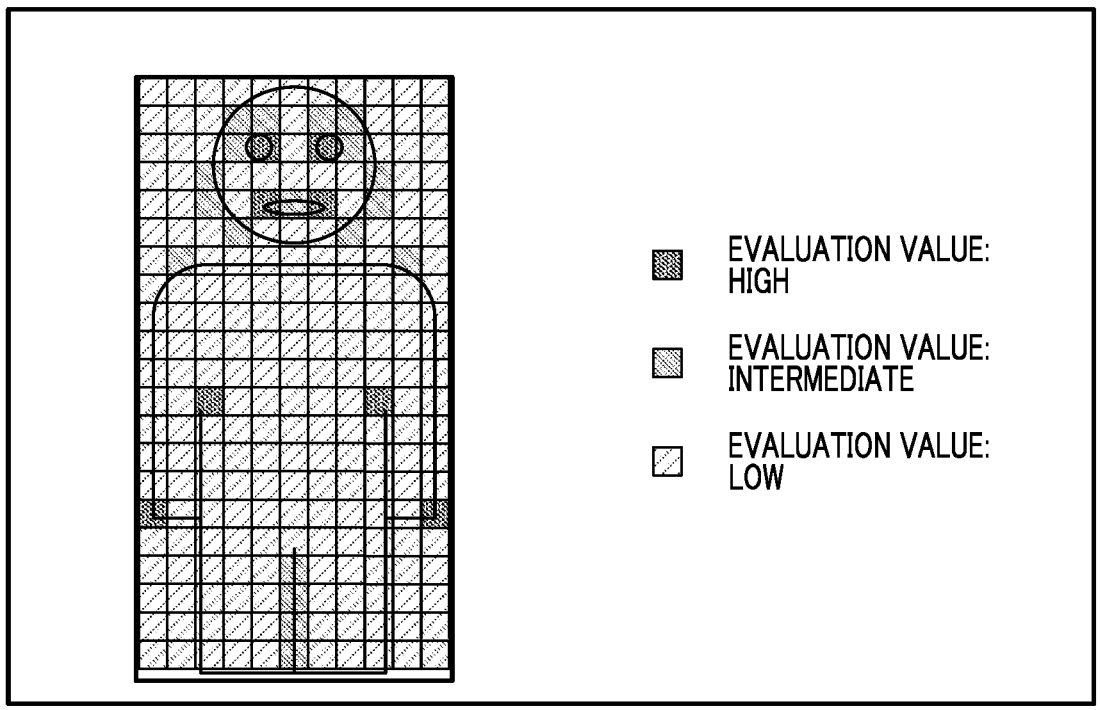
FIG. 14 is a schematic diagram of evaluation value color-coded display according to the second embodiment.

FIG. 13 is a flowchart illustrating display control performed if color-coded display is valid, and a display unit 113 is controlled using a CPU 114 and a display control unit 112. FIG. 14 is a schematic diagram illustrating an example of color-coded display on a screen of the display unit 113 according to the detection status of subjects.

In this embodiment, an example in which color-coded display according to a degree of remarkability of feature points inside each rectangular block is performed if the inside of a subject area is divided into rectangular blocks is illustrated. Inside a display area corresponding to a subject area, rectangular blocks having a high evaluation value is displayed in a first color, rectangular blocks having an intermediate level of evaluation values are displayed in a second color, and rectangular blocks having a low evaluation value are displayed in a third color. In FIG. 14, a color distribution is represented using shades. In other words, the rectangular blocks having the first color in the color distribution inside the subject area is represented darkest, and the rectangular blocks having the third color are represented lightest. Although an example of a color distribution of three levels (high, intermediate, and low) based on determination of evaluation values is illustrated, it can be extended to display of evaluation values of four or more levels.

In S1301 illustrated in FIG. 13, the remarkability calculating unit 202 designates rectangular blocks present inside the subject area for which color-coded display is performed. In S1302, the remarkability calculating unit 202 determines whether a degree of remarkability of the inside of the rectangular blocks designated in S1301 is equal to or higher than a first threshold (denoted as $\alpha$). If it is determined that the degree of remarkability of the inside of the rectangular blocks is equal to or higher than the threshold $\alpha$, the process proceeds to the process of S1304. On the other hand, if it is determined that the degree of remarkability of the inside of the rectangular blocks is lower than the threshold $\alpha$, the process proceeds to the process of S1303.

In S1303, the remarkability calculating unit 202 determines whether the degree of remarkability of the inside of the rectangular blocks designated in S1301 is equal to or higher than a second threshold (denoted as $\beta$; "$\alpha$>$\beta$"). If it is determined that the degree of remarkability of the inside of the rectangular blocks is equal to or higher than the threshold $\beta$, the process proceeds to the process of S1305. On the other hand, if it is determined that the degree of remarkability of the inside of the rectangular blocks is lower than the threshold $\beta$, the process proceeds to the process of S1306.

In S1304, the display unit 113 displays the inside of the rectangular blocks of which the degree of remarkability is determined to be equal to or higher than the threshold $\alpha$ in S1302 in the first color. A color depth corresponding to the first color is set to color depth 1, In S1305, the display unit 113 displays the inside of the rectangular blocks of which the degree of remarkability is determined to be equal to or higher than the threshold $\beta$ in S1303 in the second color. A color depth corresponding to the second color is set to color depth 2. In S1306, the display unit 113 displays the inside of the rectangular blocks of which the degree of remarkability is determined to be lower than the threshold $\beta$ in S1303 in the third color. A color depth corresponding to the third color is set to color depth 3.

In this embodiment, the thresholds $\alpha$ and $\beta$ of two levels are set, and the relation of "$\alpha$>$\beta$" is set. For display colors, three levels of the color depth 1, the color depth 2, and the color depth 3 are set. The color depth 1 corresponds to evaluation value "high", the color depth 2 corresponds to evaluation value "intermediate", and the color depth 3 corresponds to evaluation value "low". The grayscale of display colors can be changed by setting thresholds to arbitrary levels.

In S1307 after S1304, S1305, and S1306, the process of determining whether the process has been completed for all the target areas is performed. If it is determined that the process has been completed for all the target areas, the color-coded display process according to evaluation values ends. On the other hand, if it is determined that the process has not been completed for all the target areas, the process returns to S1301, and the processes of S1301 to S1306 are repeatedly performed.

Figure 15:
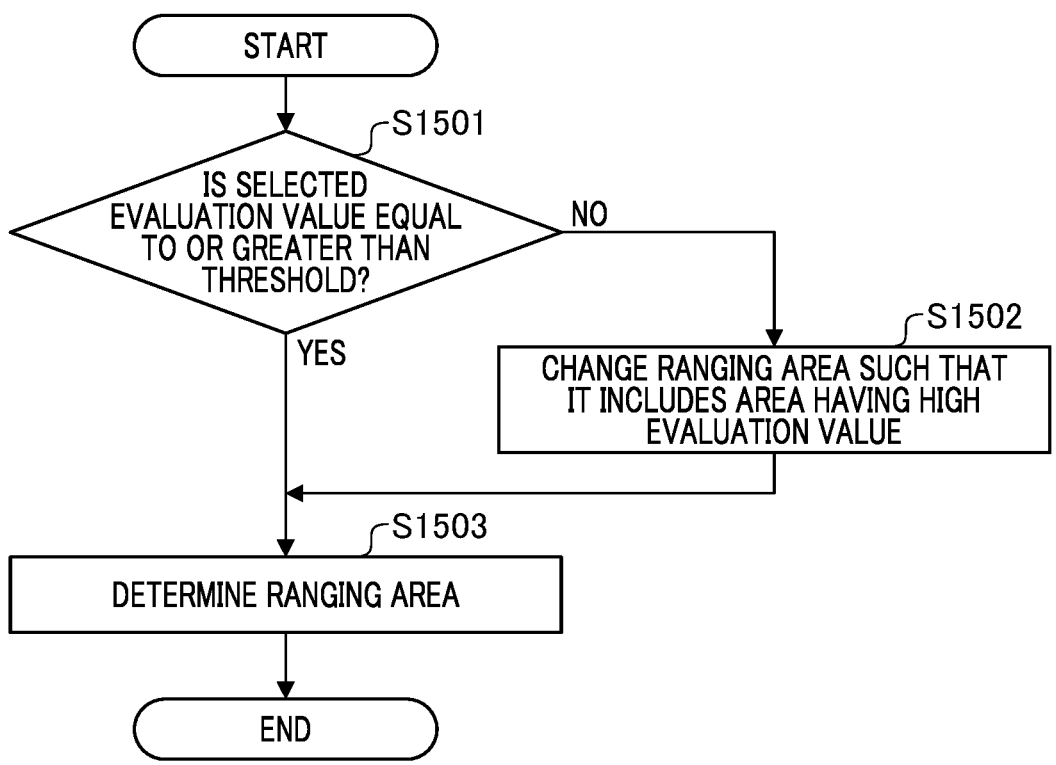
FIG. 15 is a flowchart illustrating ranging area control according to the second embodiment.

A process of determining a ranging area according to display colors will be described with reference to FIG. 15. FIG. 15 is a flowchart illustrating the process of S314 illustrated in FIG. 3, in other words, the process of determining a ranging area in accordance with a display color of the area selected in S313.

In S1501, the CPU 114 determines whether a color depth corresponding to a display color of the area selected in S313 illustrated in FIG. 3 is the color depth 1 or the color depth 2. Here, a process of determining whether an evaluation value of the selected area is equal to or greater than the threshold $\beta$ is performed. If it is determined that the color depth corresponding to the display color of the selected area is the color depth 1 or the color depth 2, the process proceeds to the process of S1503. On the other hand, if it is determined that the color depth corresponding to the display color of the selected area is the color depth 3, the process proceeds to the process of S1502.

In S1502, if the color depth corresponding to the display color of the selected area is the color depth 3 (the evaluation value "low"), the CPU 114 changes the ranging area such that it includes the area of the color depth 1 (the evaluation value "high"). Then, the process proceeds to the process of S1503. In S1503, the CPU 114 determines a ranging area corresponding to the display color of the area selected in S313 illustrated in FIG. 3. After S1503, the process ends.

Figure 16A:
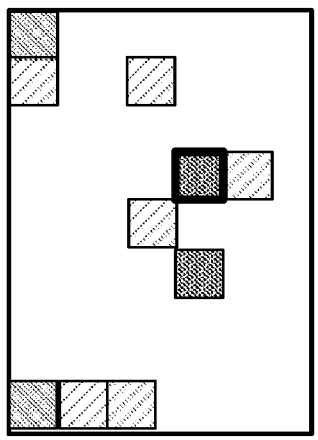
FIGS. 16A to 16D are schematic diagrams illustrating an example of ranging area control according to the second embodiment.

FIGS. 16A to 16D are schematic diagrams illustrating differences of ranging areas corresponding to selected evaluation values. In FIG. 16A, the area of the color depth 1 (the evaluation value "high") selected in S313 illustrated in FIG.

Figure 16B:
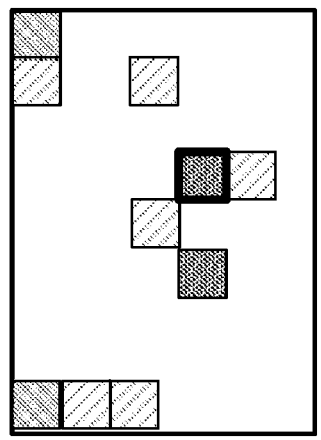
Figure 16C:
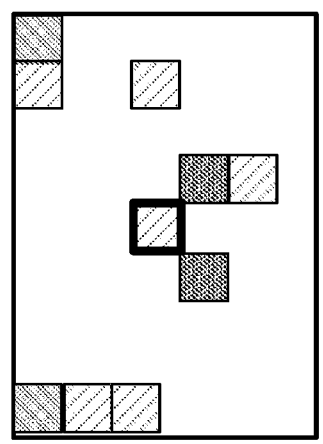
Figure 16D:
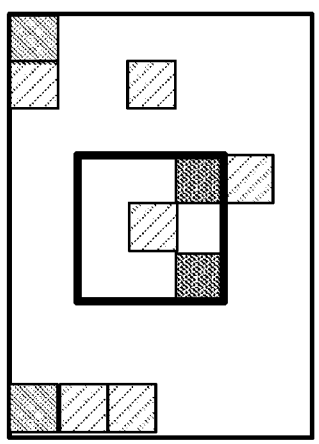

3 is illustrated in a ranging area frame. In FIG. 16B, a ranging area frame determined in accordance with the display color (the evaluation value) of the area selected in FIG. 16A is illustrated. In FIG. 16C, the area of the color depth 3 (the evaluation value "low") selected in S313 illustrated in FIG. 3 is illustrated in a ranging area frame. FIG. 16D illustrates an example in which the ranging area frame is changed to include an area of which an evaluation value is high for the display color (the evaluation value) of the area selected in FIG. 16C. In other words, the ranging area frame includes an area of the evaluation value "low" and a plurality of areas of which evaluation values are "high" that are present in the vicinity thereof. Here, an example in which an area used for a ranging process or a subject tracking process performed thereafter is changed using an internal process if the selected evaluation value is low is illustrated.

FIGS. 17A to 17D are schematic diagrams illustrating an example in which, if a color depth corresponding to the display color of the selected area is the color depth 3 (the evaluation value "low"), a plurality of candidate frames for a ranging area are displayed, and reselection is performed. FIG. 17A, the area of the color depth 3 (the evaluation value "low") selected in S313 illustrated in FIG. 3 is illustrated in a ranging area frame. In FIGS. 17B, 17C, and 17D, ranging position candidate frames including an area of the color depth 3 (the evaluation value "low") and areas, of which evaluation values are high, present in the vicinity thereof are displayed. An area reselected for the ranging position candidate frame is determined as a ranging area. In FIG. 17B, an area of which the evaluation value is "high" is present on the lower right side of an area having the color depth 3 (the evaluation value "low"), In FIG. 17C, an area of which the evaluation value is "high" is present on the upper right side of an area having the color depth 3 (the evaluation value "low"). In FIG. 17D, an area of which the evaluation value is "high" is present on the upper side of an area having the color depth 3 (the evaluation value "low"). In any one of the cases, a ranging position candidate frame including an area of which an evaluation value is relatively high is displayed for the display color (the evaluation value) of the ranging area frame illustrated in FIG. 17A. An area that is reselected in accordance with a user operation is determined as a ranging area.

In this embodiment, by performing color-coded display based on evaluation values, a user can visually recognize a ranging position candidate. In addition, by controlling the color-coded display using the threshold, areas of which evaluation values are relatively high are distinguishably displayed. A user can easily select a desired ranging area, and a ranging area can be determined with both ranging performance and user's intention taken into account.

Modified Example of Second Embodiment

In the second embodiment, although the color-coded display method for areas divided into rectangular blocks has been described as a method for displaying ranging position candidate frames, the display area is not limited to a rectangular block in a modified example. For example, a grouping process is performed for area of which evaluation values are similar, and a ranging position candidate frame is displayed using the grouped areas. In addition, in place of the color-coded display, icon display may be used such that heights of evaluation values and a difference in the height can be identified by the user.

In addition, in the modified example, the number and intensities of feature points and information of feature quantities are used in the process of calculating an evaluation value. The number of feature points is the number of detected feature points, a density, or the like. For example, the intensity of a feature point is an index representing strength of the feature such as a cross edge or a corner, and when a low contrast, blurs, and deviations are present in the image area, the intensity decreases. A feature quantity is an index that represents the status of a feature point and the vicinity thereof, and feature quantities tend to become similar values in a repeated pattern or the like. If the number of feature points is large, if the intensity of the feature point is high, or it is determined that there is no similar area on the basis of feature quantities, the evaluation value "high" is calculated.

THIRD EMBODIMENT

Next, a third embodiment of the present invention will be described. In the embodiment described above, an example in which a subject detection status is used as a method for controlling display of evaluation values is illustrated. More specifically, in accordance with a detection status of a pupil, a face, and a head part of a specific subject such as a person, display control according to an evaluation value acquired from an image is performed. In contrast to this, in this embodiment, an example in which evaluation value display is controlled in accordance with a size of a detected subject regardless of the type of subject and a specific detection method is illustrated.

Figure 18:
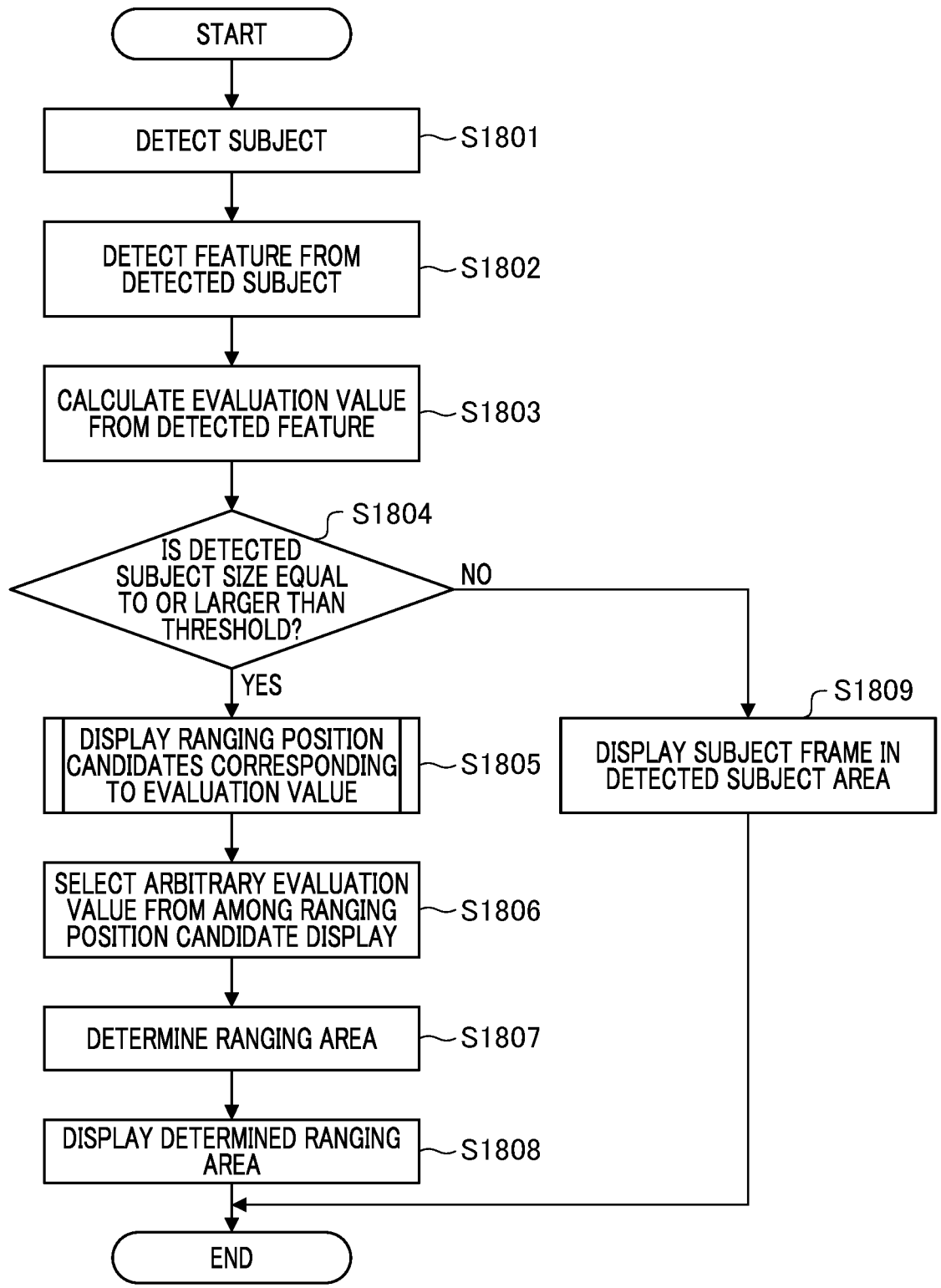
FIG. 18 is a flowchart illustrating evaluation value display control according to a third embodiment.

FIG. 18 is a flowchart of evaluation value display control according to sizes of detected subjects. In S1801, the process of detecting subject area from a captured image is performed. Here, for example, subjects are a head part of a person, a dog, and a flower. In S1802, the feature point detecting unit 201 detects feature points from the subject area detected in S1801. The process of S1802 is a process similar to S302 illustrated in FIG. 3.

In S1803, the evaluation value calculating unit 206 calculates evaluation values of the feature points detected in S1802. The process of S1803 is a process similar to S303 illustrated in FIG. 3. In S1804, the CPU 114 performs the process of determining whether the size of the subject area detected in S1801 is equal to or larger than a threshold (denoted as Q). If it is determined that the size of the subject area is equal to or larger than the threshold Q, the process proceeds to the process of S1805. On the other hand, if it is determined that the size of the subject area is smaller than the threshold Q, the process proceeds to the process of S1809.

In S1805, the CPU 114 performs the process of setting evaluation value display according to evaluation values calculated in S1803 to be valid, and ranging position candidates are displayed. As examples of the evaluation value display method, there are the frame display method described in the first embodiment, the color-coded display method described in the second embodiment, and the like. In S1806, the process of selecting an arbitrary evaluation value display from evaluation value displays displayed in S1805 is performed. The process of S1806 is a process similar to S313 illustrated in FIG. 3. For example, as a manual selection method, selection is performed in accordance with a touch operation, a button operation, a stick operation, or the like that is performed by a user.

In S1807, the CPU 114 performs the process of determining a ranging area on the basis of the evaluation value display selected in S1806. The process of S1807 is a process similar to S314 illustrated in FIG. 3. In S1808, the display unit 113 displays the ranging area determined in S1807. The process of S1808 is a process similar to S315 illustrated in FIG. 3. After S1808, the process ends.

Figure 19B:
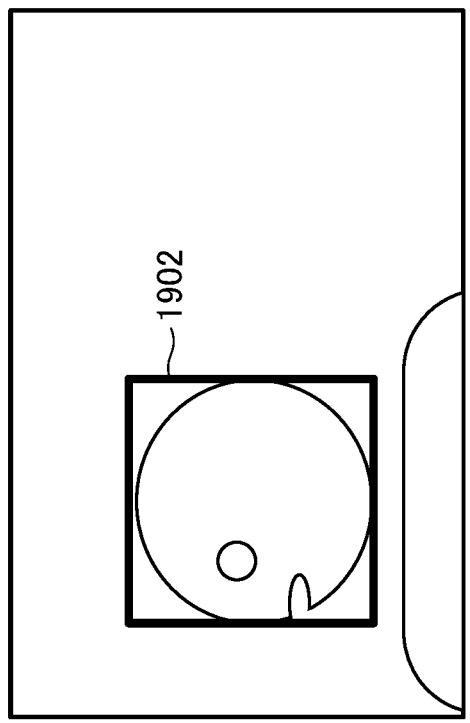
FIGS. 19A and 19B are schematic diagrams illustrating a difference in a subject detection size according to the third embodiment.
Figure 19A:
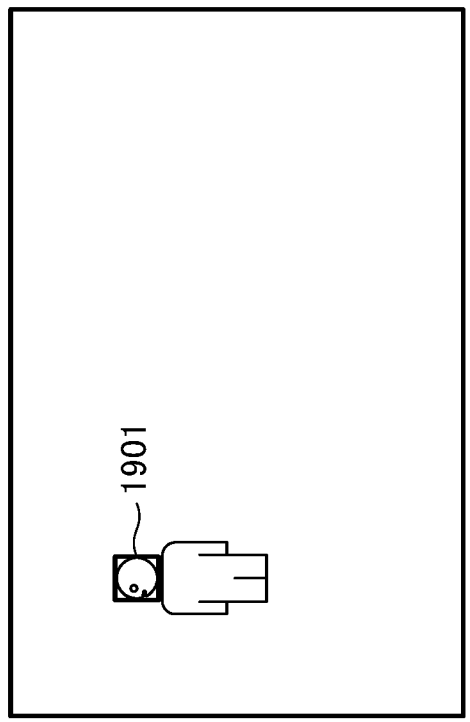

FIGS. 19A and 19B are schematic diagrams illustrating a difference in sizes of detected subject areas. FIG. 19A illustrates a status in which a head part 1901 of a subject person is detected. The size of the detected subject area is small, and thus the evaluation value display is not performed. Similar to FIG. 19A, FIG. 19B illustrates a status in which a head part 1902 of a subject person is detected. The size of the detected subject area is large, and thus a view in which it is difficult to understand a ranging position inside the subject area is formed. In such an example, the evaluation value display control is set to be valid in accordance with the size of the subject area, and ranging position candidates are displayed.

In S1809 illustrated in FIG. 18, the display unit 113 displays a subject frame in the detected subject area. If the threshold Q is set as a variable value, control of evaluation value display according to the size of the detected subject area can be performed by changing the threshold Q. After S1809, the process ends.

In this embodiment, the evaluation value display is controlled in accordance with a size of a detected subject area (subject size). Regarding a problem that it is difficult to visually recognize a ranging area if the subject size is equal to or larger than a predetermined size, ranging position candidates can be visually displayed regardless of the subject detection method. In addition, by controlling the evaluation value display using a threshold, areas of which evaluation values are relatively high are distinguishably displayed. A user can easily select a desired ranging area, and determination of a ranging area with both ranging performance and user's intention taken into account can be performed.

In the embodiment described above, control of displaying candidates at a ranging position on the basis of an evaluation value acquired from a detection image of a subject and an image processing device enabling a ranging position selection process can be provided. The display of ranging position candidates is an example, and, the present invention can be applied to display control of a subject tracking frame and the like as various kinds of information based on the evaluation value for the subject area. In addition, the present invention can be applied to detection of a plurality of subjects. For example, first and second subjects may be detected. It is assumed that a first subject area (for example, the entire body) is detected in relation to the first subject, and a second subject area (a part) is detected in the area. In this case, control of outputting first information for displaying an indication of the second subject area in the first subject area to the display unit is performed. In addition, it is assumed that a first subject area (for example, the entire body) is detected in relation to the second subject, and a second subject area (a part) is detected in the area. In this case, control of outputting second information based on evaluation values calculated in the first subject area in this area to the display unit is performed.

FOURTH EMBODIMENT

A fourth embodiment of the present invention will be described with reference to FIGS. 20 and 21. In the first to third embodiments, a method using presence/absence of ranging area detection of subjects has been illustrated as a method for controlling selective evaluation value display. More specifically, when a local ranging area represented by a pupil or a face of a specific subject is detected, control of invalidating the evaluation value display according to evaluation values acquired from an image is performed. In addition, when no local ranging area is detected, control of validating the evaluation value display according to evaluation values acquired from an image is performed. When the evaluation value display according to evaluation values acquired from an image is invalidated, there is a possibility that a ranging area determined only on the basis of a subject detection result is an area that is not intended by a user. In this embodiment, a configuration in which evaluation value display is controlled to be valid regardless of whether or not a ranging area is detected by a subject detecting unit is illustrated.

Figure 20:
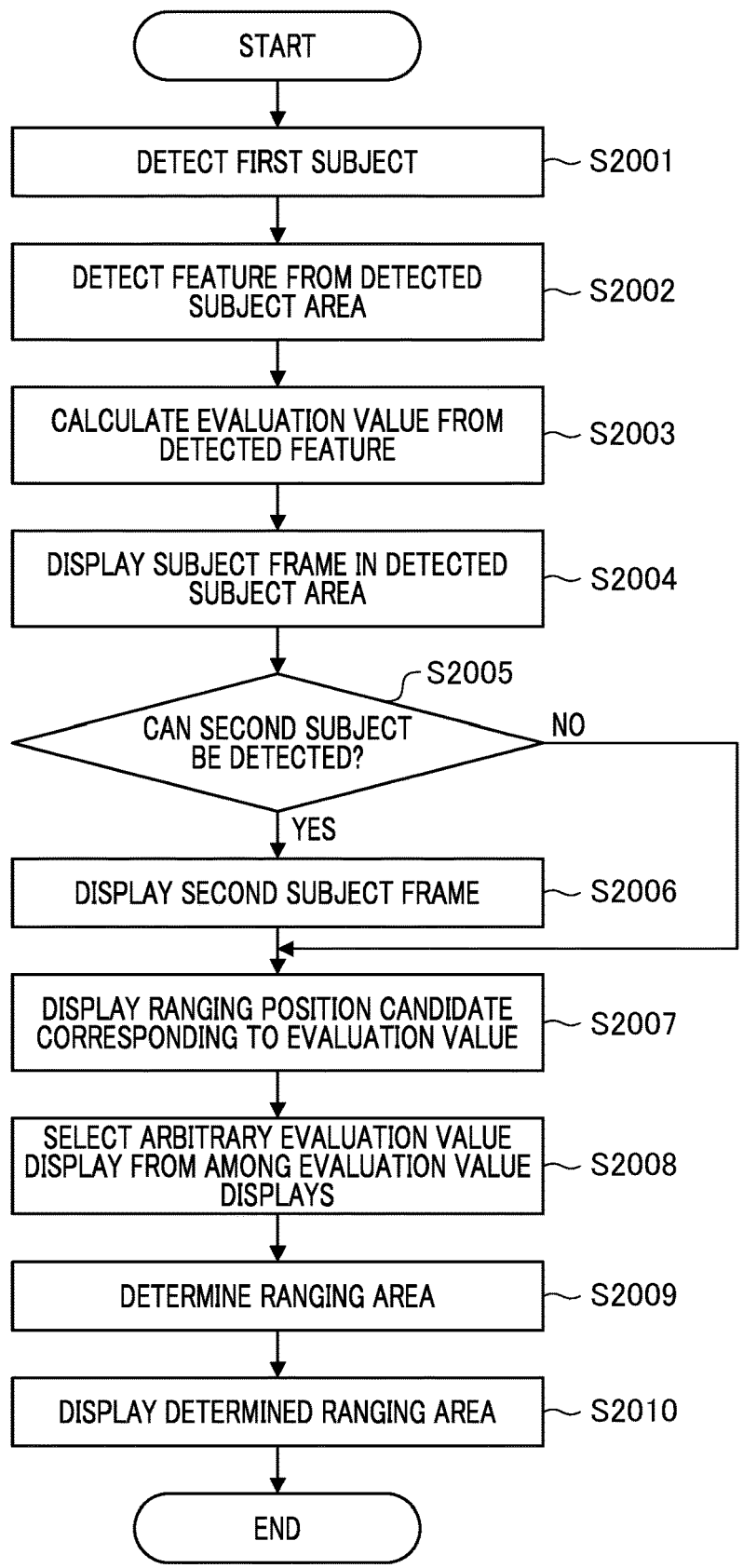
FIG. 20 is a flowchart illustrating evaluation value display control according to a fourth embodiment.
Figure 21:
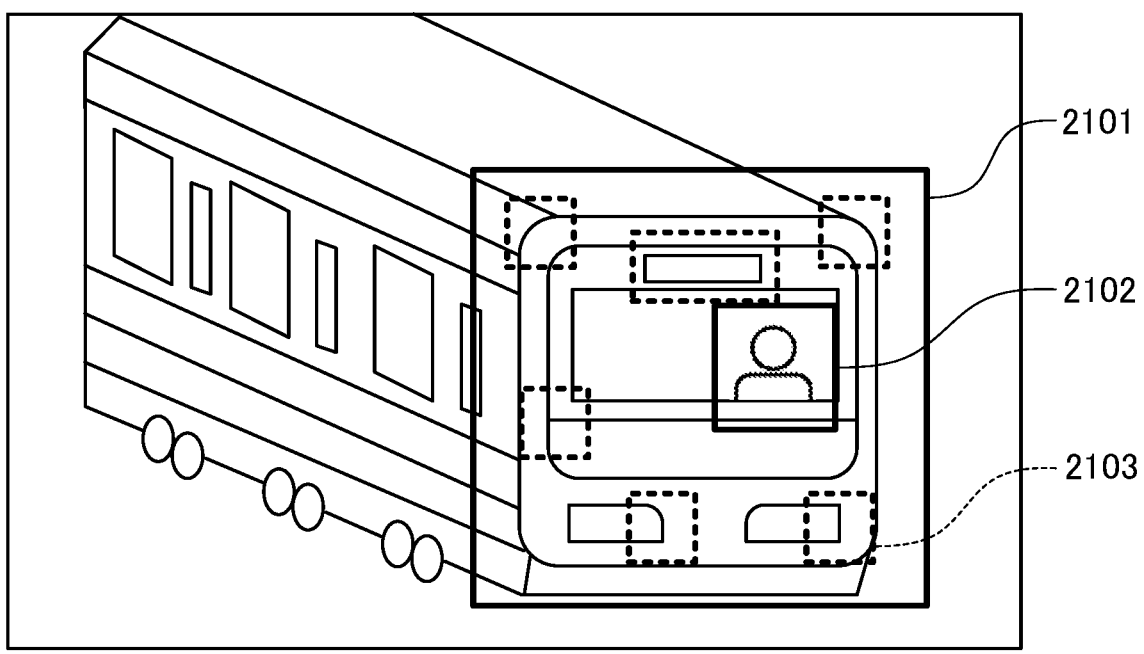
FIG. 21 is a schematic diagram of evaluation value display according to the fourth embodiment.

FIG. 20 is a flowchart of evaluation value display control according to this embodiment. In S2001, the process of detecting a first subject from an image inside the screen is performed. Here, the first subject is the entire body of a person, an entire car, an entire train, or the like.

In S2002, feature points are detected from the first subject area detected in S2001 by the feature point detecting unit 201. In S2003, evaluation values according to the feature points detected in S2002 are calculated. Similar to the embodiment described above, the process of calculating an evaluation value using one or more of a degree of remarkability, a density, a degree of similarity of feature points inside the image and a degree of reliability based on the degree of similarity is performed. The processes of S2002 and S2003 are processes common to S302 and S303 illustrated in FIG. 3.

In S2004, the process of displaying a subject frame corresponding to the subject area detected in S2001 is performed. In S2005, the CPU 114 determines whether a second subject can be detected inside the subject area detected in S2001. Here, the second subject is a local area such as a pupil or a face of a person, a driver seat of a train, or the like. If it is determined that the second subject can be detected, the process proceeds to S2006. On the other hand, if it is determined that the second subject cannot be detected, the process proceeds to S2007.

In S2006, the display unit 113 displays a subject frame corresponding to the detected second subject area. In S2007, the CPU 114 validates evaluation value display (display of a ranging candidate frame) according to the evaluation value calculated in S2003. FIG. 21 is a diagram illustrating a case in which a second subject detection result and evaluation value display according to this embodiment are displayed in parallel. An example in which the first subject is a train, and the second subject is a driver seat of the train is illustrated. A detection frame 2101 of the train that is a first subject detection result is displayed, and a detection frame 2102 of the driver seat of the train that is a second subject detection result and an evaluation value display frame 2103 according to the calculated evaluation value are displayed inside the detection frame 2101. A plurality of evaluation value display frames 2103 are included in the detection frame 2101 corresponding to the first subject area, and a calculation result of the evaluation value is displayed in an area different from the area of the driver seat that is the second subject area. The evaluation value display method is not limited to the method of displaying frames, and a method of displaying icons, a method of color-coded display, or the like may be used.

In S2008 illustrated in FIG. 20, the process of selecting an arbitrary area from a detection frame corresponding to the second subject area displayed in S2006 and evaluation value display information displayed in S2007 is performed. The process of S2008 is a process common to S313 illustrated in FIG. 3, and there is a selection method using a touch operation, a button operation, a stick operation, or the like.

In S2009, the CPU 114 determines a ranging area on the basis of the area selected in S2008. In S2010, the CPU 114 performs the process of displaying the ranging area determined in S2009 on the display unit 113. The processes of S2009 and S2010 are processes that are common to S314 and S315 illustrated in FIG. 3.

In this embodiment, by controlling the evaluation value display to be valid regardless of whether a ranging area is detected by a subject detecting unit, determination of a ranging position with user's intention reflected thereon without being dependent on a subject detection result can be performed. In other words, a ranging area determined on the basis of a subject detection result can be inhibited from being an area different from user's intention. In addition, similar to the embodiment described above, a user can select an area of which an evaluation value is relatively high by performing the threshold control relating to the evaluation value display, and thus determination of a ranging area having high ranging performance can be performed.

FIFTH EMBODIMENT

A fifth embodiment of the present invention will be described with reference to FIGS. 22 to 24. In the first to fourth embodiments, detection of subjects, detection of ranging area candidates, the method of controlling evaluation value display, user's selection of a ranging area, and the like have been described. In this embodiment, in addition to the process of searching for and tracking a subject area between frames, the process of searching for and tracking a ranging area between frames if the ranging area is an area different from the subject area will be described.

Figure 22:
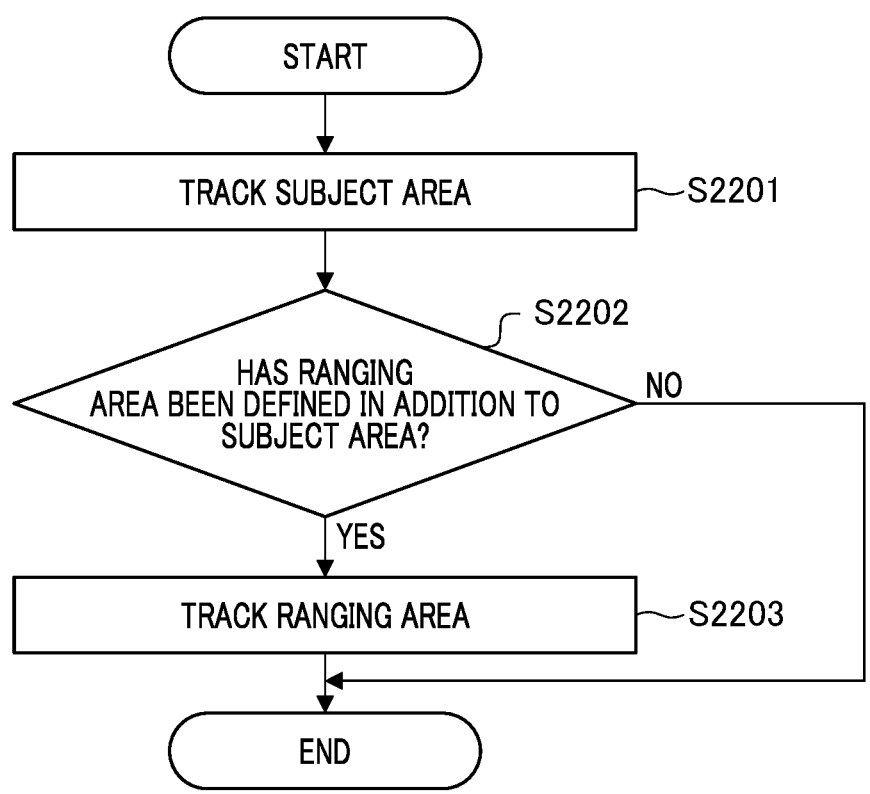
FIG. 22 is a flowchart illustrating a tracking process according to a fifth embodiment.

FIG. 22 is a flowchart illustrating the process of subject tracking control according to this embodiment. When a subject is detected by a subject detecting unit, the process of this flowchart starts. In S2201, the image processing unit 104 performs a tracking process for the detected subject area. The tracking process is a process in which a correlation process between an image of a subject area that is a tracking target and a latest frame image is performed for a frame of a captured image acquired at a certain capture period, and an area or a position having the highest correlation is acquired as a subject movement area or a position of the tracking target.

Next, in S2202, the CPU 114 determines whether or not a ranging area other than the subject area is defined. Regarding the ranging area, a part of a main subject area detected separately from the detected main subject area or a subject area; which includes the part, having a size that is appropriate for ranging may be defined as a ranging area. Alternatively, there is a case in which an area is selected by a user from candidate ranging areas acquired from evaluation values and is defined as a ranging area and the like. If the ranging area is not defined, the process ends. On the other hand, if the ranging area is defined, the process proceeds to S2203.

In S2203, a tracking process for a ranging area is performed. Similar to the tracking of a subject area, the tracking process for a ranging area is performed by the image processing unit 104. In the tracking process, a correlation process between an image of the ranging area that is a tracking target and the latest frame image is performed, and an area having the highest correlation is regarded as a tracking result of the ranging area. A specific description will be presented with reference to FIG. 23.

Figure 23:
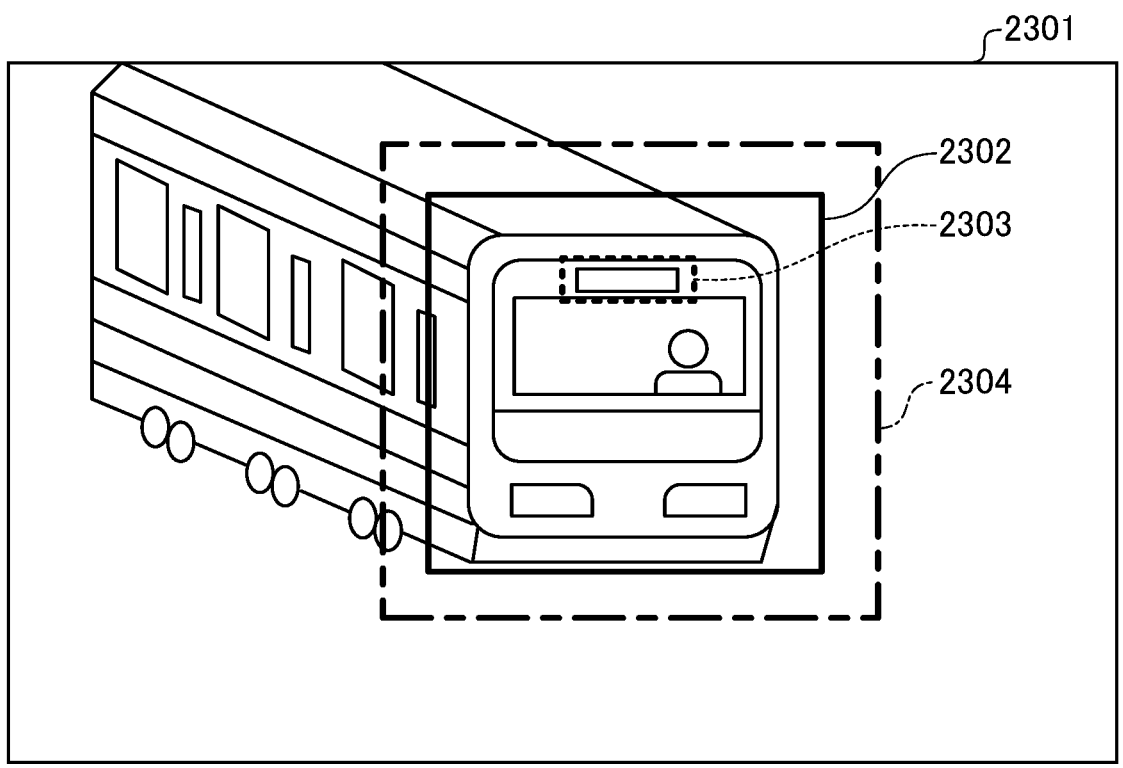
FIG. 23 is a diagram illustrating a search range of ranging frame tracking according to the fifth embodiment.

FIG. 23 is a diagram illustrating an example in which a tracking result of a ranging area is displayed as a ranging frame and an example of a range in which a correlation process for the latest frame image is performed when the tracking process for a ranging area is performed. A captured image 2301 is the entire captured image and is an example of a display image. A subject frame 2302 is an example in which a main subject area detected from the captured image 2301 is displayed as a subject frame.

A ranging frame 2303 is an example in which a ranging area determined as an area including a part of the subject area is displayed as a ranging frame. The ranging frame 2303 is set such that it can be clearly identified by a user through naked eyes using a method of changing the color of the frame to be different from that of the subject frame 2302, a method of representing the ranging frame using a line type different from the subject frame 2302 such as a dotted line, or the like. Regarding an area (ranging area) inside the ranging frame 2303, there are a case in which an area detected from the captured image 2301 is determined as a ranging area and a case in which the area is determined by a user selecting from candidate ranging areas acquired from evaluation values.

For an area (subject area) displayed in the subject frame 2302 and a ranging area displayed as the ranging frame 2303, by performing the tracking of a subject area described with reference to FIG. 22 and tracking of a ranging area, stable frame display between frames can be performed for a user.

An area 2304 illustrated in FIG. 23 is an example of a search area for which a correlation process for the captured image 2301 is performed when the tracking process for the ranging area is performed. In the tracking process for a ranging area in S2203 illustrated in FIG. 22, a correlation process between the image of the ranging area and the captured image 2301 that is the latest frame image may be performed. At this time, there is a method in which a correlation process with the entire captured image 2301 is not performed, and a correlation process is performed for the search area 2304 determined on the basis of the subject frame 2302. The search area 2304, for example, may be acquired as an outer area having a fixed sized for the subject frame 2302 or may be acquired as an outer area by a size of a constant ratio to the size of the subject frame 2302. By setting the search area 2304 in the tracking process for a ranging area not as the entire frame image, not only shortening of the processing time and reduction of power consumption can be acquired, and, by limiting the range of the correlation process, but also the accuracy of the tracking process for the ranging area can be improved. Although FIG. 23 illustrates a form in which a subject area is represented as the subject frame 2302, and a ranging area is represented as the ranging frame 2303 (a frame representation form), each area may be presented to the user in a different representation form such as a representation form in which only corners of each area are represented.

Figure 24:
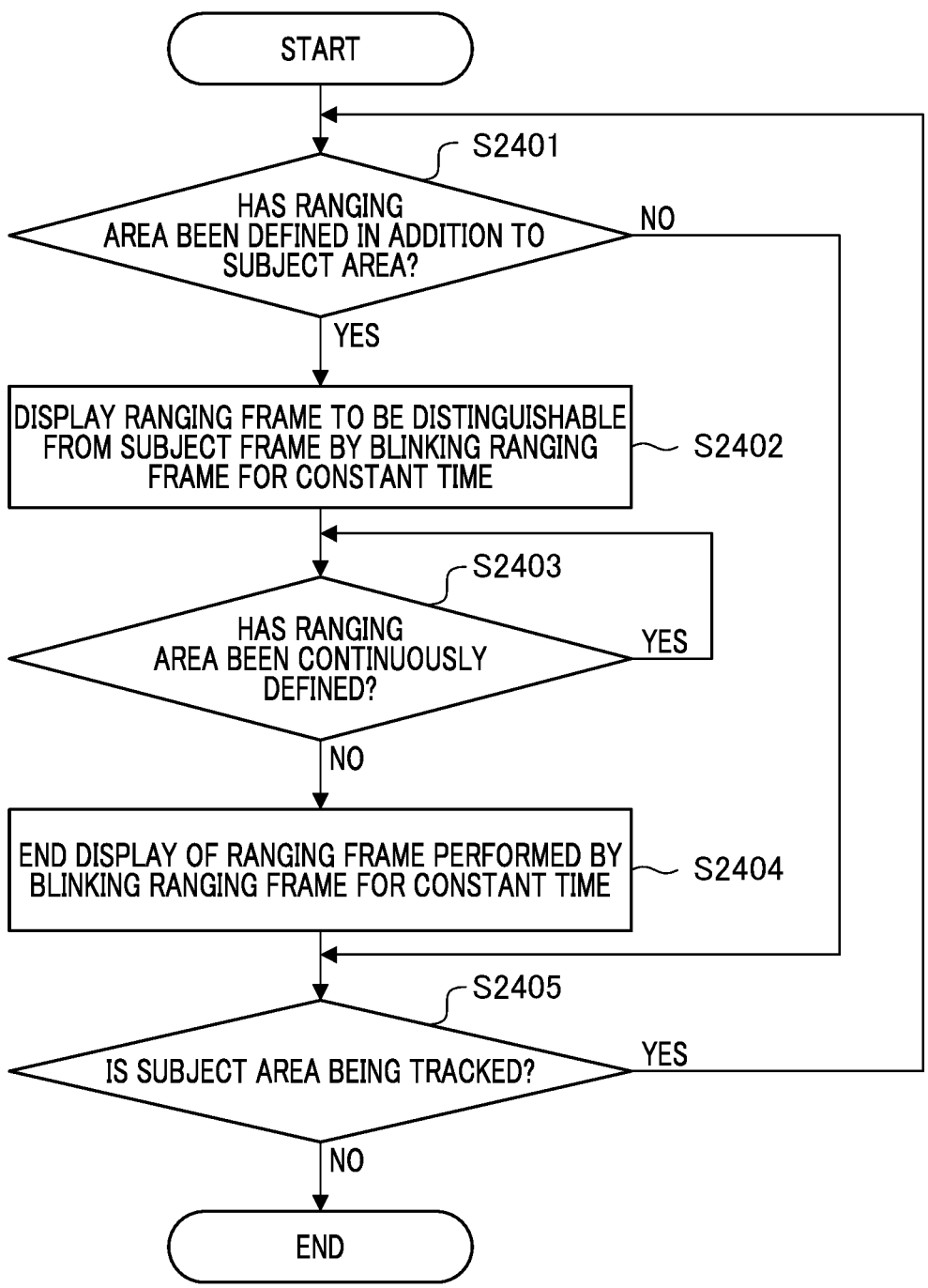
FIG. 24 is a flowchart illustrating ranging frame display control according to the fifth embodiment.

FIG. 24 is a flowchart illustrating display control of a ranging area. When a subject is detected by a subject detecting unit, and subject tracking starts, the process of this flowchart starts. In S2401, the CPU 114 determines whether or not a ranging area other than the subject area is defined. Similar to S2202 illustrated in FIG. 22, a part of a main subject area detected separately from the detected main subject area or a subject area, which includes the part, having a size that is appropriate for ranging may be defined as a ranging area. Alternatively, there is a case in which an area is selected by a user from candidate ranging areas acquired from evaluation values and is defined as a ranging area and the like. If the ranging area is not defined, the process proceeds to S2405. On the other hand, if the ranging area is defined, the process proceeds to S2402.

In S2402, a ranging frame corresponding to the ranging area is displayed with blinking over a constant time. Thereafter, the ranging frame is continuously displayed. In accordance with blinking display, start of display of a ranging fame in addition to the subject frame can be notified to the user. The blinking display for a constant time is an example, start of display may be represented using another method such as a method of displaying the ranging frame in a color different from a color during normal display for a constant time or a method of displaying the ranging frame to be gradually darkened. Next, the process proceeds to the process of S2403.

In S2403, the CPU 114 determines whether or not the ranging area is continuously defined. If the ranging area is continuously defined, a determination process is repeated in S2403 until the ranging area is not defined. When definition of a ranging area other than the subject area ends, the process proceeds to S2404. A case in which definition of a ranging area ends, for example, is a case in which a part of the main subject area or a subject area, which has a size appropriate for ranging, including the part is not detected separately from the detected main subject area. Alternatively, the case is a case in which designation of the ranging area is released from a user, a case of a lost state in the tracking control for a ranging area, in other words, a case in which a target is lost, or the like.

In S2404, blinking display of a ranging frame is performed over a constant time. Thereafter, the ranging frame is erased, and the display of the ranging frame ends. By using the blinking display, the user can be notified that display of the ranging frame ends soon. The blinking display for a constant time is an example, the end of the display may be indicated using another method such as a method in which the ranging frame is displayed in a color different from the color during the normal display for a constant time, a method of displaying the ranging frame to be gradually lightened, or the like. Next, in S2405, the CPU 114 determines whether the subject area is being tracked. If the subject area is being tracked, the process proceeds to S2401. On the other hand, if the tracking control for the subject area ends, the process of this flowchart ends.

In this embodiment, if a ranging area is defined separately from the subject area, tracking control for the ranging area is performed. Not only if the ranging area coincides with the subject area but also if the ranging area is an area different from the subject area, stable tracking control for a ranging area between frame images can be performed. As a result, more stable ranging control can be realized.

Although the preferred embodiments of the present invention have been described, the present invention is not limited to the embodiments described above, and various modifications, alternations, and combinations can be performed within the range of the concept thereof.

OTHER EMBODIMENT

The present invention can be realized also by a process in which a program realizing one or more functions according to the embodiment described above is supplied to a system or a device through a network or a storage medium, and one or more processors included in a computer of the system or the device reads and executes the program. In addition, the present invention can be realized also by a circuit realizing one or more functions (for example, an ASIC).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing device comprising:
at least one processor and at least one memory functioning as a plurality of units comprising:
(1) a detection unit configured to detect (a) a first area inside an image that corresponds to a subject and (b) a second area inside the image that corresponds to a part of the subject;
(2) a calculation unit configured to calculate a plurality of evaluation values from a plurality of information of feature points inside the image, respectively, and
(3) a control unit configured to perform control of outputting information related to a ranging area to a display unit displaying the image,
wherein the control unit performs control of outputting, to the display unit, (a) inside a display area corresponding to the first area, a selected one of (i) first information representing the second area detected by the detection unit and (ii) a plurality of second information based on the plurality of evaluation values calculated by the calculation unit, as a candidate for a ranging area corresponding to the subject, together with (b) information representing the first area detected by the detection unit, and
wherein the control unit selects the ranging area from the candidate for the ranging area corresponding to the plurality of second information displayed on the display unit based on a user operation.

2. The image processing device according to claim 1, wherein the control unit performs control of outputting the first information to the display unit in the first area if the first area is detected by the detection unit and the second area is detected in the first area by the detection unit, and performs control of outputting the second information to the display unit in the first area if the first area is detected by the detection unit and the second area is not detected by the detection unit in the first area.

3. The image processing device according to claim 1, wherein the detection unit detects an entire subject as the first area and detects a part of the subject as the second area.

4. The image processing device according to claim 1, wherein the processor and the memory further function as an acquisition unit configured to acquire the plurality of information of feature points in the first area, and
wherein the control unit performs control of determining the plurality of evaluation values calculated from the plurality of information of feature points by the calculation unit and outputting the second information to the display unit.

5. The image processing device according to claim 2, wherein the display unit displays the second information inside a display area corresponding to the first area if the second area is not detected by the detection unit.

6. The image processing device according to claim 1, wherein the calculation unit calculates the plurality of evaluation values using at least one of a degree of remarkability, a density, and a degree of similarity of the feature points inside the image, and a degree of reliability based on the degree of similarity.

7. The image processing device according to claim 1, wherein the control unit performs control of (1) outputting to the display unit, as the first information, information of a display frame displaying the second area or (2) outputting to the display unit, as the second information, information of a plurality of display frames corresponding to the plurality of evaluation values.

8. The image processing device according to claim 7, wherein the control unit performs control of changing the number of the plurality of display frames corresponding to the plurality of evaluation values by comparing the plurality of evaluation values with a threshold.

9. The image processing device according to claim 7, wherein the control unit performs control of (1) selecting one of the plurality of display frames corresponding to the plurality of evaluation values and (2) determining a ranging area corresponding to the selected display frame.

10. The image processing device according to claim 1, wherein the control unit performs control of outputting to the display unit, as the second information, information of a plurality of frames corresponding to the plurality of evaluation values or a display color corresponding to the plurality of evaluation values, if a size of the second area is equal to or larger than a threshold.

11. The image processing device according to claim 1, wherein the calculation unit calculates a degree of similarity from feature quantities between feature points inside the image, performs determination of a degree of reliability based on the degree of similarity, and determines the plurality of evaluation values on the basis of a determination result of the degree of reliability.

12. The image processing device according to claim 1, wherein the control unit performs control of causing the display unit to display candidate frames for a ranging position that correspond to feature points of which degrees of remarkability are larger than a threshold in an area in which a density of the plurality of feature points inside the image is equal to or higher than a threshold.

13. The image processing device according to claim 7, wherein the control unit performs control of causing the display unit to display a first ranging position and a display frame of a ranging area including a second ranging position at which the evaluation value is higher than that of the first ranging position.

14. The image processing device according to claim 3, wherein the detection unit detects, as the second area, a pupil, a face, or a head part of the subject.

15. The image processing device according to claim 1, wherein the control unit performs tracking control of a subject area corresponding to the subject using a correlation process between a first image designated on the basis of the detected subject and an input second image.

16. The image processing device according to claim 15, wherein the control unit determines a part of the detected first area as a ranging area and performs tracking control of the ranging area.

17. An imaging apparatus comprising:
the image processing device according to claim 1.

18. The image processing device according to claim 1, wherein the control unit performs control of causing the display unit to display (a) inside the display area corresponding to the first area, one of (i) the second area as a ranging area corresponding to the subject and (ii) a plurality of display frames corresponding to the plurality of evaluation values, as a candidate for the ranging area corresponding to the subject, together with (b) the display area corresponding to the first area.

19. A method of controlling an image processing device, the method comprising:
detecting (a) a first area inside an image that corresponds to a subject and (b) a second area inside the image that corresponds to a part of the subject;
calculating a plurality of evaluation values from a plurality of information of feature points inside the image, respectively; and
performing control of outputting information related to a ranging area to a display unit displaying the image,
wherein, in the performing control, (1) control is performed of outputting, to the display unit, (a) inside a display area corresponding to the first area, a selected one of (i) first information representing the second area detected by the detecting and (ii) a plurality of second information based on the plurality of evaluation values calculated by the calculating, as a candidate for a ranging area corresponding to the subject, together with (b) information representing the first area detected by the detecting, and (2) the ranging area is selected from the candidate for the ranging area corresponding to the plurality of second information displayed on the display unit based on a user operation.

20. A non-transitory storage medium on which is stored a computer program for making a computer of an image processing device execute a method, the method comprising:
detecting (a) a first area inside an image that corresponds to a subject and (b) a second area inside the image that corresponds to a part of the subject;
calculating a plurality of evaluation values from a plurality of information of feature points inside the image, respectively; and
performing control of outputting information related to a ranging area to a display unit displaying the image,
wherein, in the performing control, (1) control is performed of outputting, to the display unit, (a) inside a display area corresponding to the first area, a selected one of (i) first information representing the second area detected by the detecting and (ii) a plurality of second information based on the plurality of evaluation values calculated by the calculating, as a candidate for a ranging area corresponding to the subject, together with (b) information representing the first area detected by the detecting, and (2) the ranging area is selected from the candidate for the ranging area corresponding to the plurality of second information displayed on the display unit based on a user operation.

* * * * *